(12) United States Patent
Ogawa et al.

(10) Patent No.: US 11,720,768 B2
(45) Date of Patent: Aug. 8, 2023

(54) COMPUTER-READABLE MEDIUM, IMAGE PROCESSING DEVICE, AND METHOD FOR REDUCING TIME TAKEN FROM INPUT OF PRINT INSTRUCTION UNTIL START OF PRINTING

(71) Applicant: Brother Kogyo Kabushiki Kaisha, Nagoya (JP)

(72) Inventors: Kazuaki Ogawa, Ichinomiya (JP); Longlong Ruan, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/651,244

(22) Filed: Feb. 16, 2022

(65) Prior Publication Data
US 2022/0284248 A1   Sep. 8, 2022

(30) Foreign Application Priority Data

Mar. 4, 2021 (JP) ................................ 2021-034855

(51) Int. Cl.
*G06K 15/02* (2006.01)
*G06F 3/12* (2006.01)

(52) U.S. Cl.
CPC ....... *G06K 15/1814* (2013.01); *G06F 3/1206* (2013.01); *G06F 3/1256* (2013.01); *G06K 15/1815* (2013.01); *G06F 3/1204* (2013.01)

(58) Field of Classification Search
CPC ............ G06K 15/1814; G06K 15/1815; G06F 3/1206; G06F 3/1256; G06F 3/1204; G06F 3/1213; G06F 3/1247; G06F 3/1285

USPC ........................................................ 358/1.15
See application file for complete search history.

(56) References Cited

U.S. PATENT DOCUMENTS

| | | | | |
|---|---|---|---|---|
| 2005/0001024 A1* | 1/2005 | Kusaka | ................. | G06V 40/16 340/5.2 |
| 2012/0036432 A1* | 2/2012 | Mizoguchi | ............ | G06F 3/1285 715/274 |

FOREIGN PATENT DOCUMENTS

JP      2008-213406 A    9/2008

* cited by examiner

*Primary Examiner* — Darryl V Dottin
(74) *Attorney, Agent, or Firm* — Burr Patent Law, PLLC

(57) ABSTRACT

A non-transitory computer-readable medium stores computer-readable instructions executable by a hardware processor communicably connected with a printing device and a user interface. The instructions are configured to, when executed by the hardware processor, cause the hardware processor to perform one or more printing processes. Each printing process includes, after obtaining a data selection instruction via the user interface, obtaining a print instruction corresponding to the data selection instruction via the user interface. Each printing process further includes starting generating the print data using target image data selected based on the data selection instruction, after obtaining the data selection instruction and before obtaining the print instruction. Each printing process further includes, even after the print data has been generated, not starting providing the print data until obtaining the print instruction, but starting providing the print data to the printing device after obtaining the print instruction.

18 Claims, 14 Drawing Sheets

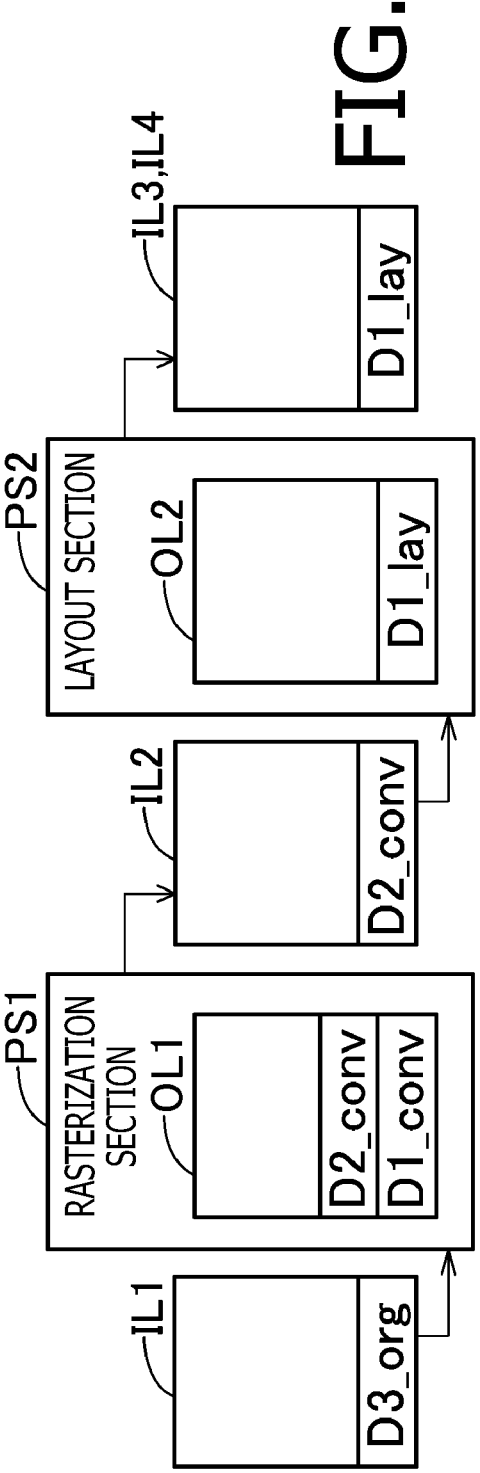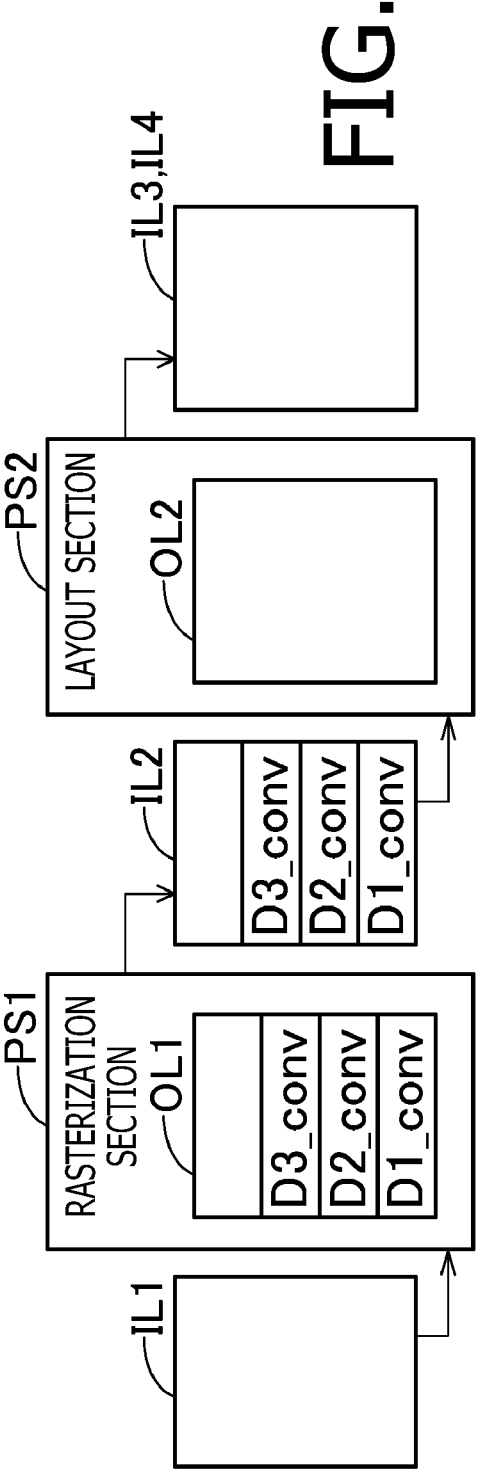

COMPUTER-READABLE MEDIUM, IMAGE PROCESSING DEVICE, AND METHOD FOR REDUCING TIME TAKEN FROM INPUT OF PRINT INSTRUCTION UNTIL START OF PRINTING

CROSS REFERENCE TO RELATED APPLICATIONS

This application claims priority under 35 U.S.C. § 119 from Japanese Patent Application No. 2021-034855 filed on Mar. 4, 2021. The entire subject matter of the application is incorporated herein by reference.

BACKGROUND

A printer has been known that has a controller configured to, when a user has pressed a print button after selecting an image file and print settings (e.g., a sheet size and layout), perform image processing including JPEG processing, resizing, and image quality correction, thereby generating expanded image data. The controller generates print data printable by a printing mechanism from the expanded image data, and controls the printing mechanism based on the print data, thereby printing an image according to the print data.

SUMMARY

Since processing time is required to generate the print data, a long time may be taken from when a print instruction has been input (e.g., when a print button has been pressed) until when printing is started.

Aspects of the present disclosure are advantageous to provide one or more improved techniques that make it possible to prevent, from being long, a time from when a print instruction has been input until when printing is started.

According to aspects of the present disclosure, a non-transitory computer-readable medium is provided, which stores computer-readable instructions executable by a hardware processor communicably connected with a printing device and a user interface. The instructions are configured to, when executed by the hardware processor, cause the hardware processor to perform one or more printing processes. Each printing process includes, after obtaining a data selection instruction input via the user interface, obtaining a print instruction corresponding to the data selection instruction via the user interface. Each printing process further includes starting generating the print data using target image data selected based on the data selection instruction, after obtaining the data selection instruction and before obtaining the print instruction. Each printing process further includes, even after the print data has been generated, not starting providing the print data to the printing device until obtaining the print instruction, but starting providing the print data to the printing device after obtaining the print instruction.

According to aspects of the present disclosure, further provided is an image processing device that includes a user interface and a controller. The controller is configured to perform one or more printing processes. Each printing process includes, after obtaining a data selection instruction input via the user interface, obtaining a print instruction corresponding to the data selection instruction via the user interface. Each printing process further includes starting generating the print data using target image data selected based on the data selection instruction, after obtaining the data selection instruction and before obtaining the print instruction. Each printing process further includes, even after the print data has been generated, not starting providing the print data to the printing device until obtaining the print instruction, but starting providing the print data to the printing device after obtaining the print instruction.

According to aspects of the present disclosure, further provided is a method implementable on a hardware processor communicably connected with a printing device and a user interface. The method includes obtaining a data selection instruction input via the user interface. The method further includes, after obtaining the data selection instruction, obtaining a print instruction corresponding to the data selection instruction via the user interface. The method further includes starting generating the print data using target image data selected based on the data selection instruction, after obtaining the data selection instruction and before obtaining the print instruction. The method further includes, even after the print data has been generated, not starting providing the print data to the printing device until obtaining the print instruction, but starting providing the print data to the printing device after obtaining the print instruction.

BRIEF DESCRIPTION OF THE DRAWINGS

FIGS. 8A to 8D illustrate the particular processes by a rasterization section PS1 and a layout section PS2.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

A. Illustrative Embodiment

A-1. Configuration of Printing System

Figure 1:
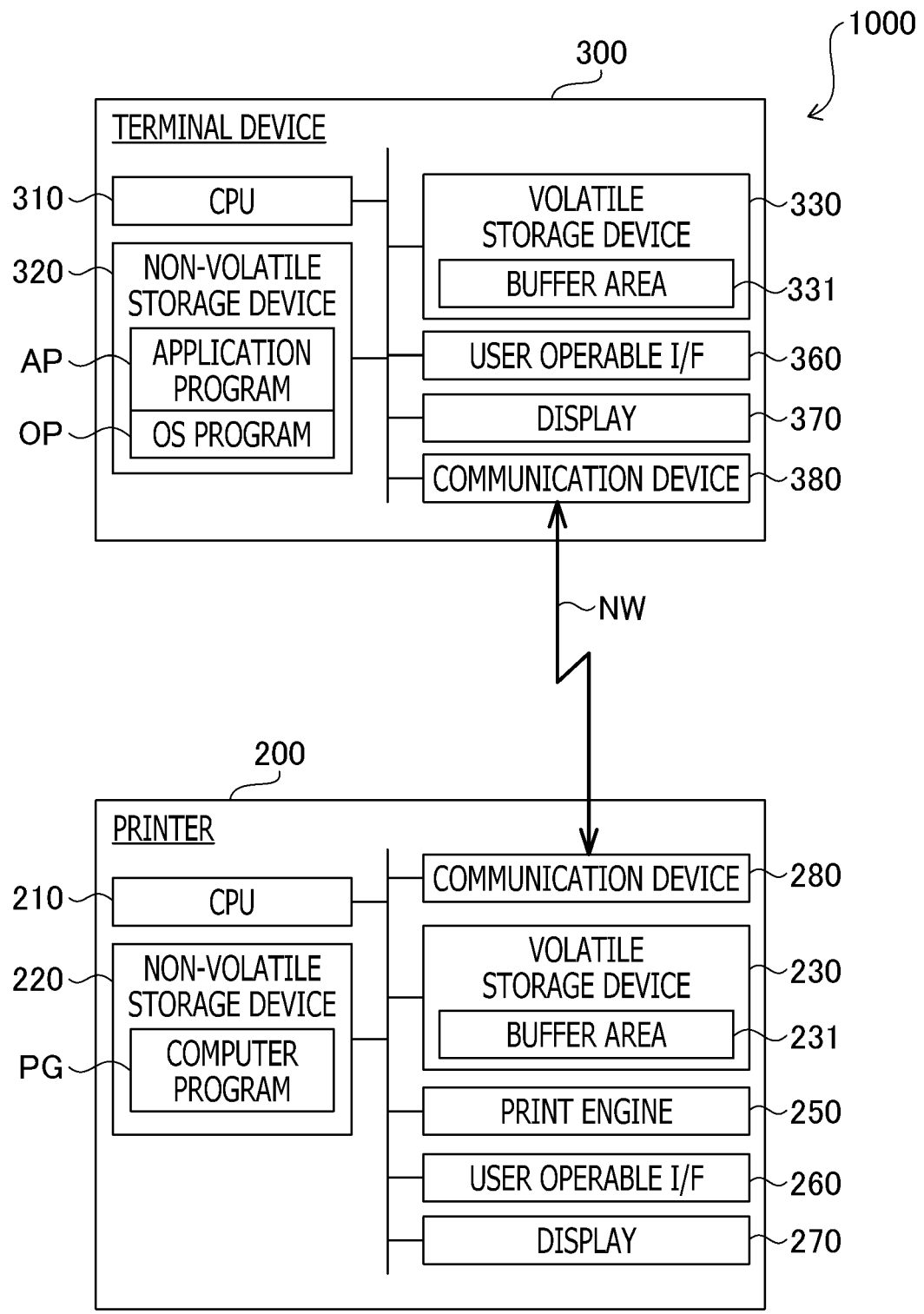
FIG. 1 is a block diagram schematically showing a configuration of a printing system including a terminal device and a printer.

An illustrative embodiment according to aspects of the present disclosure will be described with reference to the accompanying drawings. FIG. 1 is a block diagram schematically showing a configuration of a printing system 1000 in the illustrative embodiment.

The printing system 1000 includes a printer 200 and a terminal device 300. The printer 200 and the terminal device 300 are communicably connected with each other via a network NW. In the illustrative embodiment, the network NW is a wireless network for performing wireless communication according to Wi-Fi standards ("Wi-Fi" is a registered trademark of the non-profit Wi-Fi Alliance).

The terminal device 300 is a computer used by a user of the printer 200. For instance, the terminal device 200 is a smart phone. The terminal device 300 includes a CPU 310, a non-volatile storage device 320, a volatile storage device 330, a user operable I/F ("I/F" is an abbreviation for "interface") 360, a display 370, and a communication device 380. The CPU 310 is configured to control the terminal device 300. The non-volatile storage device 320 may include an HDD ("HDD" is an abbreviation for "Hard Disk Drive"), and an SSD ("SSD" is an abbreviation for "Solid State Drive"). The volatile storage device 330 may include a RAM. The user operable I/F 360 may include buttons and a touch panel, for receiving user operations. It is noted that the user operable I/F 360 may be simply referred to as the "user I/F 360." The display 370 may include an LCD ("LCD" is an abbreviation for "Liquid Crystal Display"). The communication device 380 may include a communication I/F configured to connect with the network NW. In the illustrative embodiment, the communication I/F may be a wireless communication I/F.

The volatile storage device 330 provides a buffer area 331 for the CPU 310. The non-volatile storage device 320 stores a plurality of computer programs including an application program AP and an OS ("OS" is an abbreviation for "Operating System") program OP. The CPU 310 and the non-volatile storage device 320 storing the plurality of computer programs (including the application program AP) may form a "controller" for controlling the terminal device 300.

The application program AP is configured to, when executed by the CPU 310, cause the CPU 310 to control the printer 200 to perform printing. Specific processes to be performed by the CPU 310 executing the application program AP will be described later. The application program AP is provided by the manufacturer of the printer 200, for instance, in a form of being downloaded from a server.

The OS program OP is configured to, when executed by the CPU 310, cause the CPU 310 to serve as an OS. Examples of the OS program OP may include, but are not limited to, known programs such as Android ("Android" is a registered trademark of Google LLC), iOS ("iOS" is a registered trademark of Cisco Systems, Inc.), and Windows ("Windows" is a registered trademark of Microsoft Corp.).

For instance, the printer 200 includes a print engine 250, a CPU 210, a non-volatile storage device 220, a volatile storage device 230, a user operable I/F 260, a display 270, and a communication device 280. The print engine 250 is configured to perform printing. The CPU 210 is configured to control the print engine 250. The non-volatile storage device 220 may include an HDD and a flash memory. The volatile storage device 230 may include a RAM. The user operable I/F 260 may include buttons and a touch panel, for receiving user operations. The display 270 may include an LCD. The printer 200 is communicably connected with external devices, including the terminal device 300, via the communication device 280.

The volatile storage device 230 provides a buffer area 231 to temporarily store various types of intermediate image data generated when the CPU 210 performs processing. The non-volatile storage device 220 stores a computer program PG. In the illustrative embodiment, the computer program PG is a control program for controlling the printer 200. The computer program PG may be provided in a form of being stored in the non-volatile storage device 220 at the time of shipment of the printer 200. In another instance, the computer program PG may be provided in a form of being downloaded from a server or being stored in a storage medium such as a DVD-ROM.

The print engine 250 is an inkjet printing mechanism configured to perform printing on a printing medium such as paper by ejecting a plurality of types of ink, for instance, cyan (C), magenta (M), yellow (Y), and black (K). In another instance, the print engine 250 may be an electrophotographic printing mechanism configured to perform printing on a printing medium by using a plurality of types of toner.

A-2. Overview of Print Application

Function(s) realized by the CPU 310 executing the application program AP may also be referred to as the "print application PA." The printing application PA generates print data using original image data, and causes the printer 200 to perform printing using the print data. For instance, in the illustrative embodiment, the original image data is user's image data stored in the non-volatile storage device 320. In the non-volatile storage device 320, the image data may be stored as image files in various formats such as JPEG ("JPEG" is an acronym for the Joint Photographic Experts Group which created the JPEG standard), PDF ("PDF" is an abbreviation for "Portable Document Format"), and XPS (also referred to as "XML Paper Specification").

Figure 2:
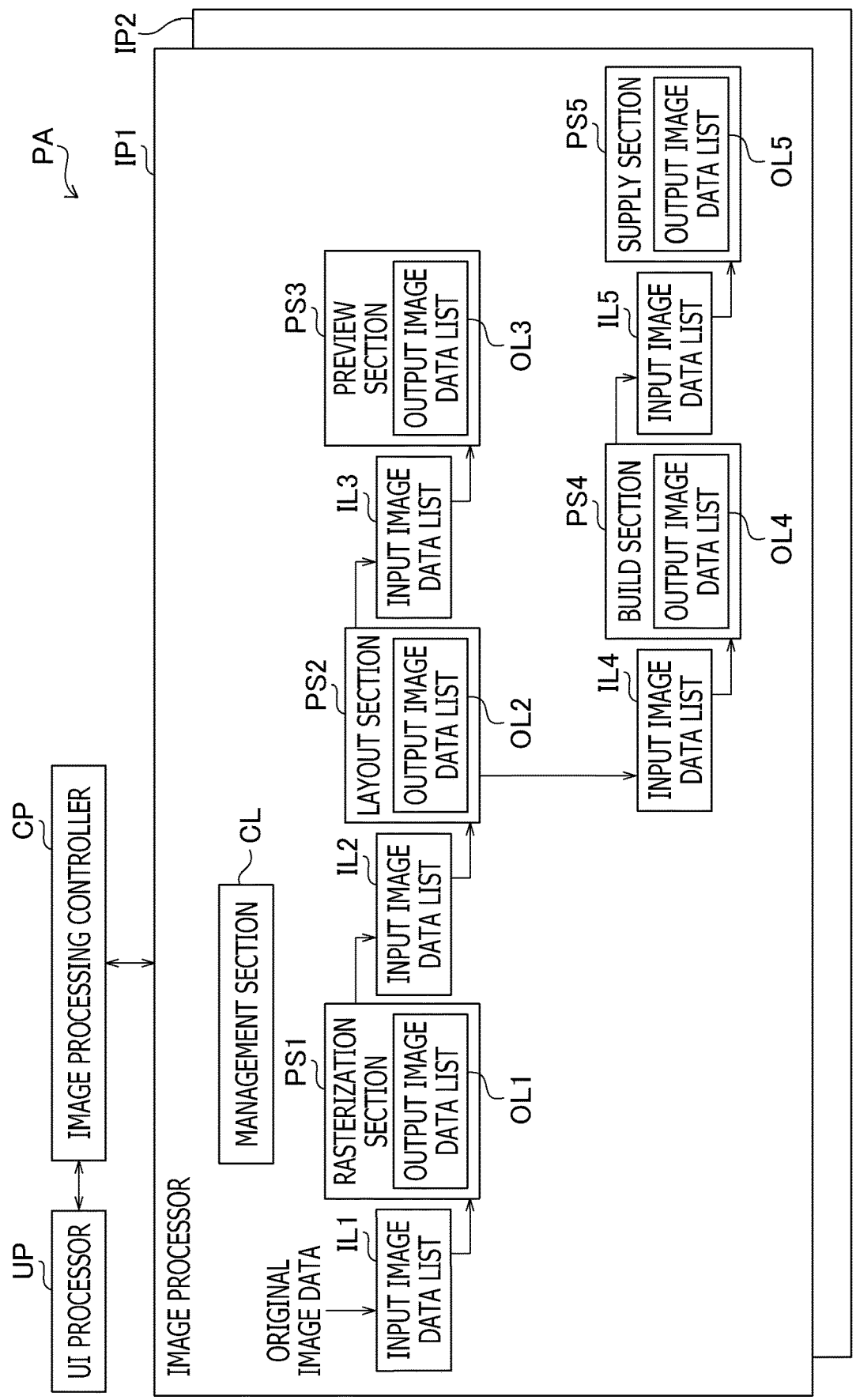
FIG. 2 is a block diagram schematically showing a functional configuration of a print application.

FIG. 2 is a block diagram showing a functional structure of the print application PA. The print application PA includes a UI ("UI" is an abbreviation for "User Interface") processor UP, a plurality of image processors IP1 and IP2, and an image processing controller CP to control the plurality of image processors. The number of the image processors is equal to or less than a below-mentioned particular upper limit number Nmax. In the example shown in FIG. 2, the number of the image processors is 2.

Figure 3A:
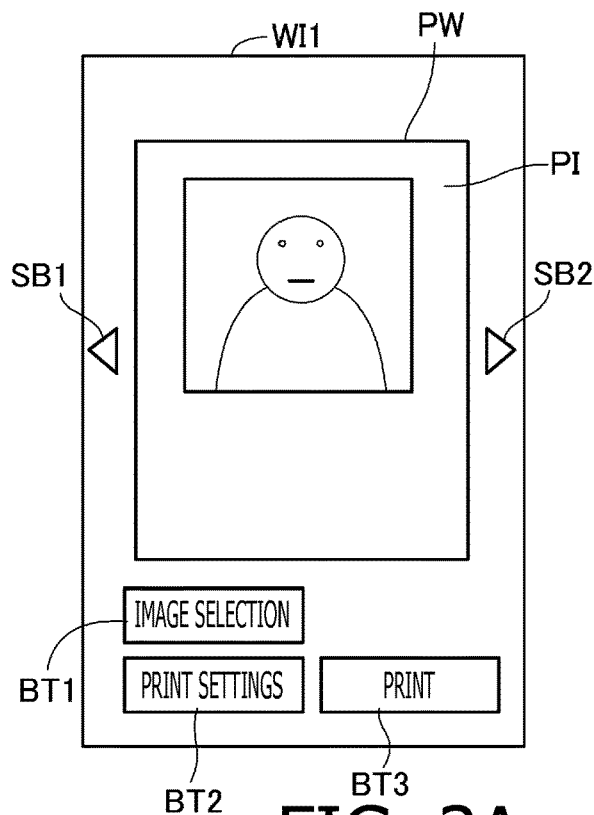
FIG. 3A shows an example of a main screen as one of UI screens.
Figure 3B:
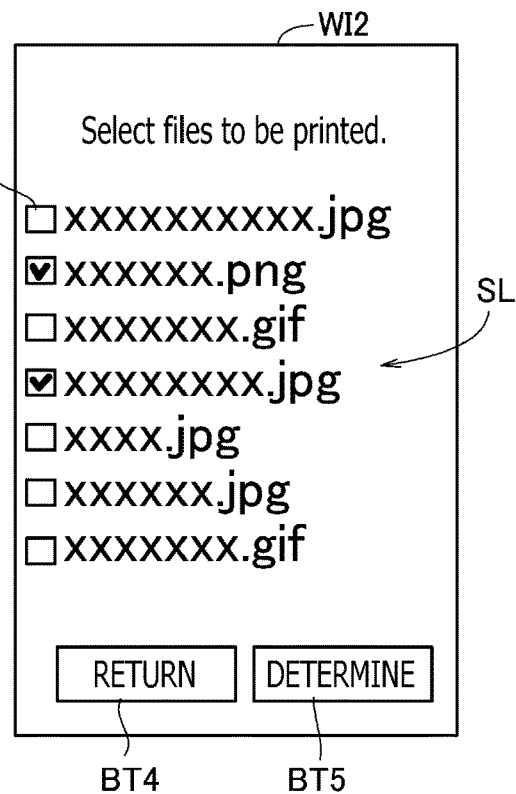
FIG. 3B shows an example of an image selection screen as one of the UI screens.
Figure 3C:
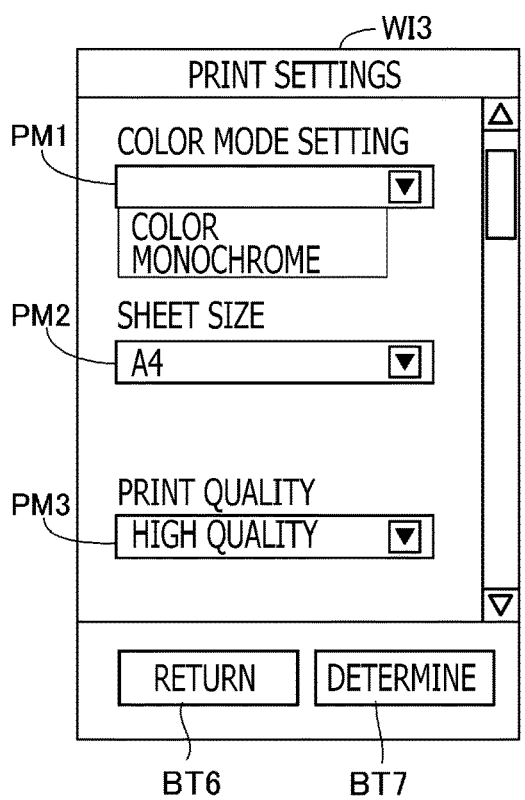
FIG. 3C shows an example of a print setting screen as one of the UI screens.

The UI processor UP is configured to display UI screens on the display 370. FIGS. 3A, 3B, and 3C show examples of the UI screens. FIG. 3A shows a main screen WI1. For instance, the UI processor UP displays the main screen WI1 on the display unit 370 when the print application PA is activated. The main screen WI1 includes a preview image display area PW and buttons BT1 to BT3, SB1, and SB2.

The preview image display area PW is an area where an image (also referred to as a "preview image PI") is displayed that is for the user to check a print image including an original image represented by original image data selected by the user. When the original image data is not selected by the user, no preview image is displayed in the preview image display area PW. When a plurality of pieces of original image data are selected, the switching button SB1 and SB2 are for switching a preview image PI to be displayed in the preview image display area PW from one preview image PI to another among a plurality of preview images PI corresponding to the selected plurality of pieces of original image data.

When an image selection button BT1 is pressed on the main screen WI1, the UI processor UP causes the display 370 to display an image selection screen WI2 shown in FIG. 3B instead of the main screen WI1. The image selection screen WI2 includes a list SL of a plurality of image files, check boxes CB for selecting one or more image files from the list SL, and buttons BT4 and BT5. In the illustrative embodiment, as shown in FIG. 3B, a plurality of image files may be selected if each image file to be selected is an image file (e.g., an image file in JPEG format or PNG format) containing image data representing a single image. In this case, the image data contained in each image file is selected as the original image data.

Only a single image file may be selected if an individual image file to be selected is an image file (e.g., an image file in PDF format) containing a plurality of pieces of page image data. It is then permissible to select one or more pieces of page image data from among the plurality of pieces of page image data contained in the single image file. In this case, each of the one or more pieces of page image data is selected as the original image data. It is noted that illustration of UI screens for selecting an image file in PDF format and one or more pieces of page image data will be omitted.

When the determination button BT5 has been pressed on the image selection screen WI2, the UI processor UP determines, as the original image data, each image data contained in the image file(s) selected via the image selection screen WI2 at that time, and causes the display 370 to display the main screen WI1 instead of the image selection screen WI2. Namely, the UI processor UP receives a data selection instruction to select the original image data from the user via the image selection screen WI2. When the return button BT4 has been pressed on the image selection screen WI2, the UI processor UP causes the display 370 to display the main screen WI1 instead of the image selection screen WI2 without determining the original image data.

In response to a print instruction button BT3 being pressed on the main screen WI1 after the data selection instruction has been received, the UI processor UP receives a print instruction corresponding to the data selection instruction. Hereinafter, the print instruction corresponding to the data selection instruction denotes an instruction to cause the printer 200 to perform printing according to a print job generated using the original image data selected by the data selection instruction. After the receipt of the print instruction, the print job is sent to the printer 200.

After the data selection instruction has been input, and before the print instruction is received, the user may select another piece of original image data on the image selection screen WI2 and press the determination button BT5 on the image selection screen WI2, thereby inputting a data change instruction. The data change instruction is an instruction to change the original image data to be used for printing.

When a print setting button BT2 has been pressed on the main screen WI1, the UI processor UP causes the display 370 to display a print setting screen WI3 (see FIG. 3C) instead of the main screen WI1. The print setting screen WI3 contains input elements for inputting print settings for a plurality of setting items. FIG. 3C shows an example of the print setting screen WI3, which includes respective pull-down menus PM1 to PM3 for inputting print settings for a color mode setting, a sheet size, and print quality. Through the pull-down menu PM1, the color mode setting is set to one of options (e.g., a monochrome mode and a color mode). Through the pull-down menu PM2, the sheet size is set to one of options (e.g., A3, A4, and A5). Through the pull-down menu PM3, the print quality is set to one of options (e.g., high quality (low speed), and low quality (high speed)). Although the following features are not shown in any drawings, the setting items settable via the print setting screen WI3 may further include various setting items other than the aforementioned setting items (i.e., the color mode setting, the sheet size, and the print quality). Specifically, for instance, the setting items settable via the print setting screen WI3 may further include, but are not limited to, margin settings, the number of copies to be printed, the number of original images included in a single printed image (also referred to as an "allocation number," and represented as, e.g., 1-in-1, 2-in-1, and 4-in-1), designation of duplex printing/single-side printing, and tray settings (designation of a feed tray for accommodating sheets to be used, and designation of a discharge tray for receiving printed sheets discharged thereon).

When a determination button BT7 has been pressed on the print setting screen WI3, the UI processor UP updates the current print settings to the print settings set on the print setting screen WI3 at that time, and causes the display 370 to display the main screen WI1 instead of the print setting screen WI3. Namely, the UI processor UP receives a print setting change instruction from the user via the print setting screen WI3. When a return button BT6 has been pressed on the print setting screen WI3, the UI processor UP causes the display 370 to display the main screen WI1 instead of the print setting screen WI3, without updating the print settings. It is noted that the print settings are set to default settings until the UI processor UP receives the print setting change instruction.

On the main screen WI1, the print instruction button BT3 is effectively operable when the original image data is selected. When the print instruction button BT3 has been pressed, the UI processor UP receives a print instruction corresponding to the data selection instruction that has already been received at that time.

The image processor IP1 includes a management section CL, a plurality of processing sections PS1 to PS5, and a plurality of input image data lists IL1 to IL5. The plurality of processing sections PS1 to PS4 operate in cooperation to generate print data using the original image data selected by the user. A supply section PS5 supplies a print job including the generated print data to the printer 200 in response to the print instruction received from the user. Thus, the terminal device 300 is enabled to cause the printer 200 to perform printing. Needless to say, "supplying a print job" has substantially the same meaning as "providing a print job."

A rasterization section PS1 is a processing section configured to perform a rasterization process using the original image data to generate bitmap data representing the original image. The bitmap data is, for instance, RGB image data that contains RGB values for each pixel. The RGB values are, for instance, color values of an RGB color system, and include three component values for red, green, and blue. The rasterization section PS1 outputs the generated bitmap data in a particular format (in the illustrative embodiment, PNG format). Thus, the input image data to the rasterization section PS1 is the original image data. The output image data from the rasterization section PS1 is the PNG-format image data (also referred to as the "converted image data") into which the original image data has been converted. When the original image data is in PNG format, the rasterization section PS1 does not perform the rasterization process, and outputs the input original image data as it is.

A layout section PS2 is a processing section configured to perform a layout process using the converted image data to generate layout image data. The layout image data represents a printed image in which one or more original images are arranged according to the print settings. For instance, margins, each of which has a set width, are added to the printed image in accordance with the margin settings. When a setting (so-called 2-in-1) to arrange two original images in a single printed image is designated, two original images are arranged in the printed image. The layout section PS2 outputs the layout image data in a particular format (in the illustrative embodiment, PNG format). Thus, the input image data to the layout section PS2 is the converted image data. The output image data from the layout section PS2 is the layout image data.

A preview section PS3 is a processing section configured to perform a preview process using the layout image data to generate preview image data. The preview image data represents one or more preview images PI. The preview image data is used to display the preview image(s) PI in the preview image display area PW on the main screen WI1. The preview process includes, for instance, various processes to adjust the preview image(s) PI according to the print settings. For instance, when the color mode setting is set to the monochrome mode, the preview image(s) PI are also preferable to be monochrome image(s). Hence, the preview process includes converting the layout image data to monochrome image data. The preview process may include, for instance, adjusting the number of pixels and the number of colors according to characteristics of the display 370. Thus, the input image data to the preview section PS3 is the layout image data. The output image data from the preview section PS3 is the preview image data.

When the preview section PS3 has generated the preview image data, the UI processor UP immediately displays the preview image(s) PI in the preview image display area PW on the main screen WI1 using the preview image data. Namely, the UI processor UP displays the preview image(s) PI on the main screen WI1 after obtainment of the data selection instruction and before obtainment of the print instruction.

A build section PS4 is a processing section configured to perform a build process using the layout image data to generate print data. The build process is a process of converting the layout image data into a data format interpretable by the printer 200. The print data is image data described in a data format interpretable by the printer 200, for instance, in a page description language such as Post-Script ("PostScript" is a registered trademark of Adobe Inc.) or PCL ("PCL" is a registered trademark of Hewlett-Packard Development Company, L.P.). The build process includes different processes depending on various print settings, such as a print resolution and which of duplex printing and single-sided printing is used. Thus, the input image data to the build section PS4 is the layout image data. The output image data from the build section PS4 is the print data.

The supply section PS5 performs a supply process using the print data. The supply process is a process of generating a print job by adding a print command to the print data, and supplying the print job to the printer 200. The supply section PS5 supplies the print job to the printer 200 by sending the print job to the printer 200 via the communication device 380. The print command to be added includes a command to specify setting items (specifically, for instance, the number of copies to be printed, the print quality, the feed tray for accommodating sheets to be used, and the discharge tray for receiving printed sheets discharged thereon) according to the print settings. Thus, the input image data to the supply section PS5 is the print data. The output image data from the supply section PS5 is the print job.

Each input image data list ILn ("n" is an integer from 1 to 5) is a list in which a path is described of each input image data to be input to the corresponding processing section PSn. Hereinafter, description of a path of image data in a list (e.g., the input image data list ILn or the output image data list OLn) will be expressed as registration of the image data in the list. The image data registered in the input image data list IL1 is the original image data, and is registered by the management section CL. The image data registered in the input image data list ILn ("n" is an integer from 2 to 5) is the output image data from the processing section PS (n−1), and is registered by the processing section PS (n−1). Each processing section PSn ("n" is an integer from 1 to 5) obtains the input image data registered in the input image data list ILn, and performs its particular process using the obtained input image data. The processing section PSn ("n" is an integer from 1 to 5) obtains the input image data one by one in the order registered in the input image data list ILn. Namely, the input image data list ILn functions as a FIFO (first in first out) queue.

Each output image data list OLn ("n" is an integer from 1 to 5) is associated with the corresponding processing section PSn. Each output image data list OLn is a list in which the output image data generated by the corresponding processing section PSn is registered. After each processing section PSn performs its particular process using the input image data and generates the output image data, each processing section PSn registers the generated output image data in the output image data list OLn in such a manner that the association between the output image data and the input image data is understandable. Therefore, by referring to the output image data list OLn, it is possible to recognize whether the output image data corresponding to a specific piece of input image data has already been generated. The processing by each processing section PSn using the input image data list ILn and the output image data list OLn will be described later in detail.

A-3. Operations of Print Application

A-3-1. Control Process

Figure 4:
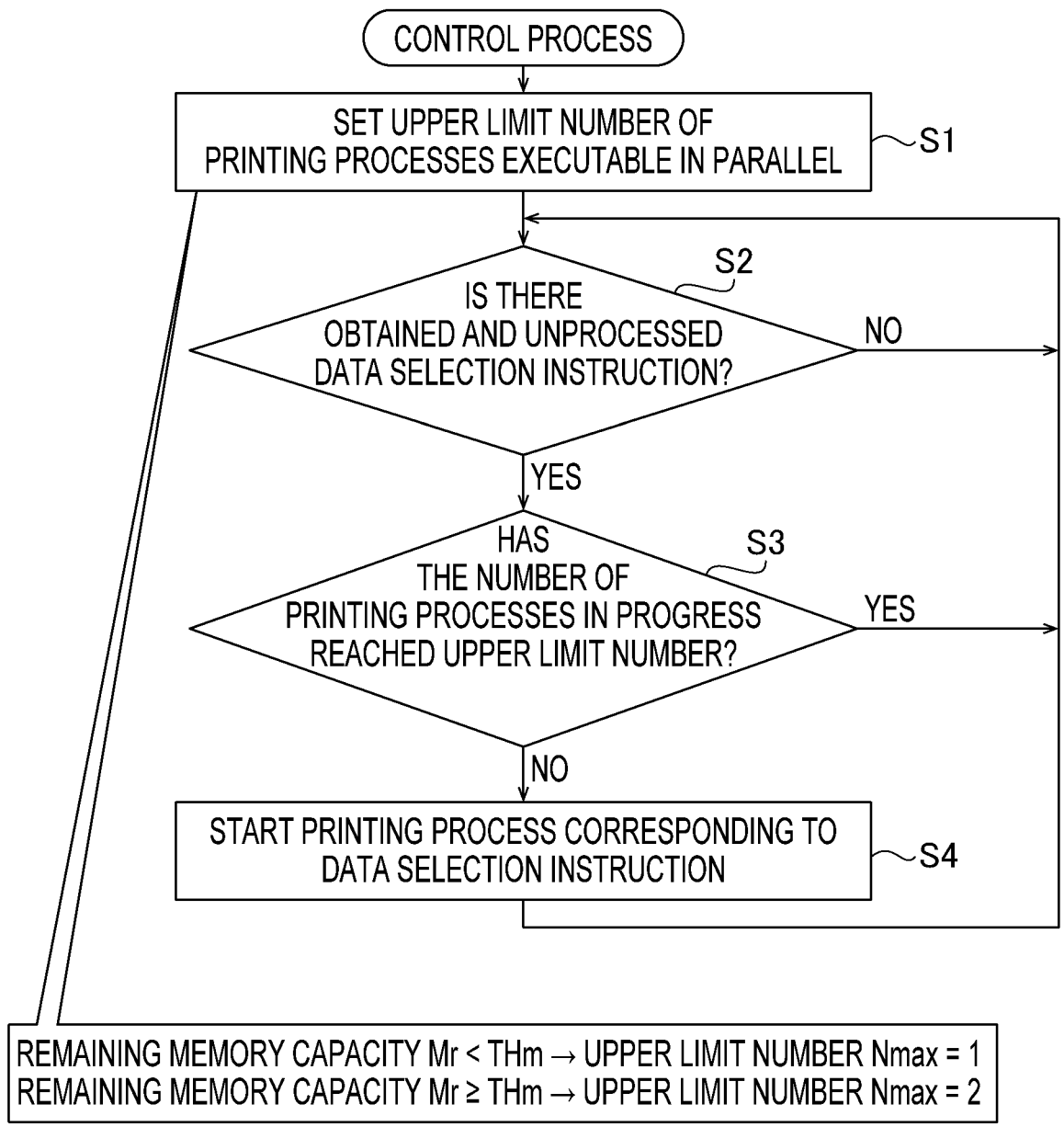
FIG. 4 is a flowchart showing a procedure of a control process.

FIG. 4 is a flowchart showing a procedure of a control process. The control process shown in FIG. 4 is performed by the image processing controller CP while one of the UI screens WI1 and WI2 is being displayed by the UI processor UP after the print application PA has been activated.

In S1, the image processing controller CP sets an upper limit number Nmax of printing processes executable in parallel, based on a remaining memory capacity Mr. Specifically, the image processing controller CP obtains a currently available remaining memory capacity Mr (e.g., a remaining capacity of the buffer area 231 of the volatile storage device 230). For instance, the remaining memory capacity Mr may be obtained from the OS. When the remaining memory capacity Mr is less than a threshold THm, the image processing controller CP sets the upper limit number Nmax to 1. Meanwhile, when the remaining memory capacity Mr is equal to or more than the threshold THm, the image processing controller CP sets the upper limit number Nmax to 2. A possible maximum value of the upper limit number Nmax is not limited to 2, but may be equal to or more than 3.

In S2, the image processing controller CP determines whether there is an obtained and unprocessed data selection instruction. For instance, when there is a data selection instruction, in response to which the corresponding printing process has not yet been started, among the data selection instructions already obtained by the UI processor UP via the image selection screen WI2, the image processing controller CP determines that there is an obtained and unprocessed data selection instruction (S2: Yes). When there is not an obtained and unprocessed data selection instruction (S2: No), the image processing controller CP waits until the UI processor UP obtains a new data selection instruction.

When there is an obtained and unprocessed data selection instruction (S2: Yes), in S3, the image processing controller CP determines whether the number of the printing processes in progress has reached the upper limit number Nmax. The printing process is a process of generating a print job and supplying the print job to the printer 200 (see below for details). When a print instruction has been obtained after obtainment of a data selection instruction, the UI processor UP may obtain a new data selection instruction. When a new data selection instruction has been obtained before completion of the printing process corresponding to the previously obtained data selection instruction, the image processing controller CP performs the two printing processes in parallel. Thus, in the illustrative embodiment, a plurality of printing processes, of which the number is equal to or less than the upper limit number Nmax, may be performed in parallel.

When the number of the printing processes in progress has reached the upper limit number Nmax (S3: Yes), the image processing controller CP waits until one of the printing processes in progress is completed and the number of the printing processes in progress is less than the upper limit number Nmax.

When the number of the printing processes in progress is less than the upper limit number Nmax (S3: No), the image processing controller CP starts a printing process corresponding to the unprocessed data selection instruction (S4). Specifically, for instance, the image processing controller CP notifies one of the image processors IP1 and IP2 of a path of original image data selected by the data selection instruction, and provides the one of the image processors IP1 and IP2 with a start instruction to start a printing process using the original image data. After S4, the image processing controller CP goes back to S2.

A-3-2. Printing Process

Figure 5:
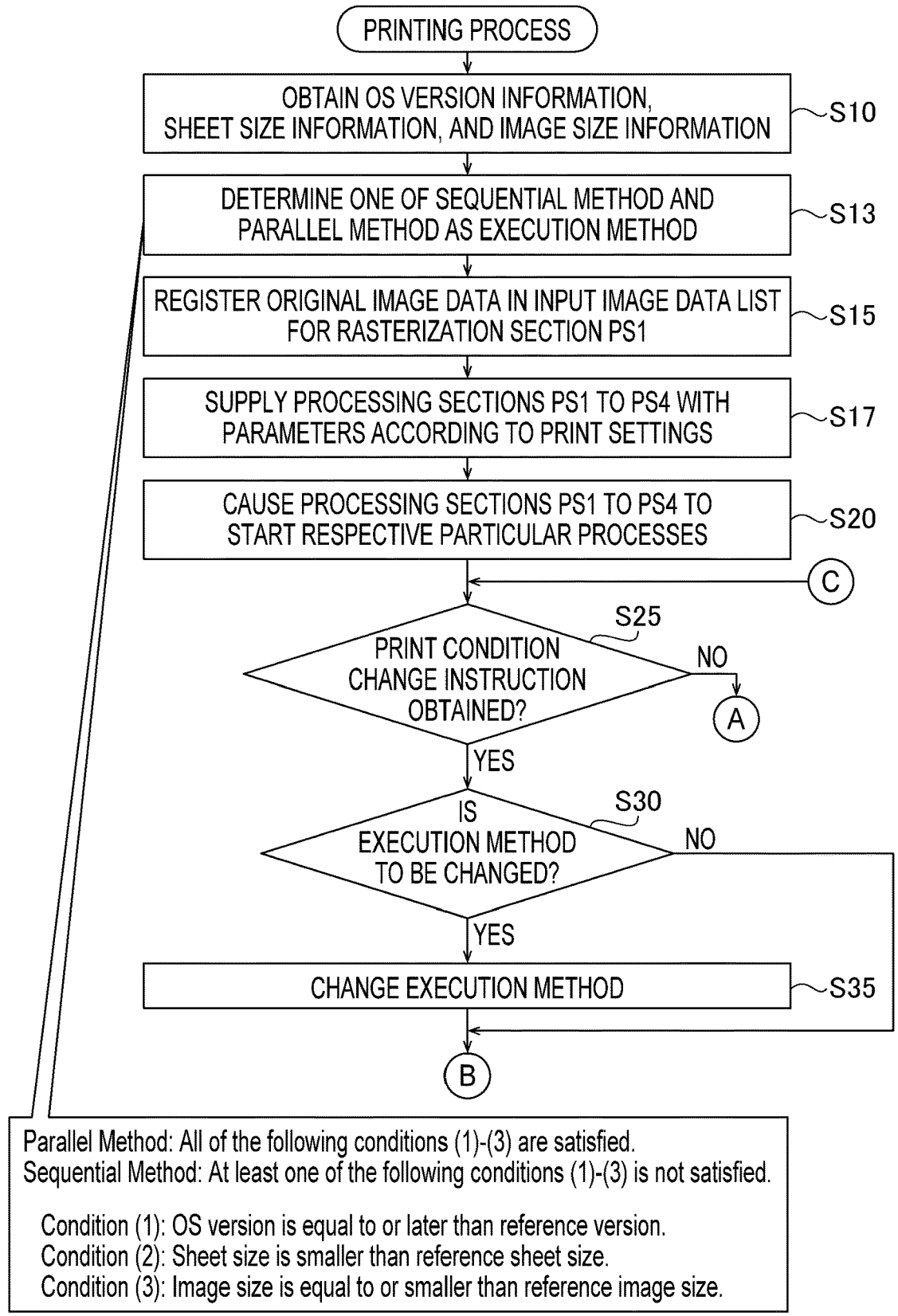
FIGS. 5 and 6 are flowcharts showing a procedure of a printing process.
Figure 6:
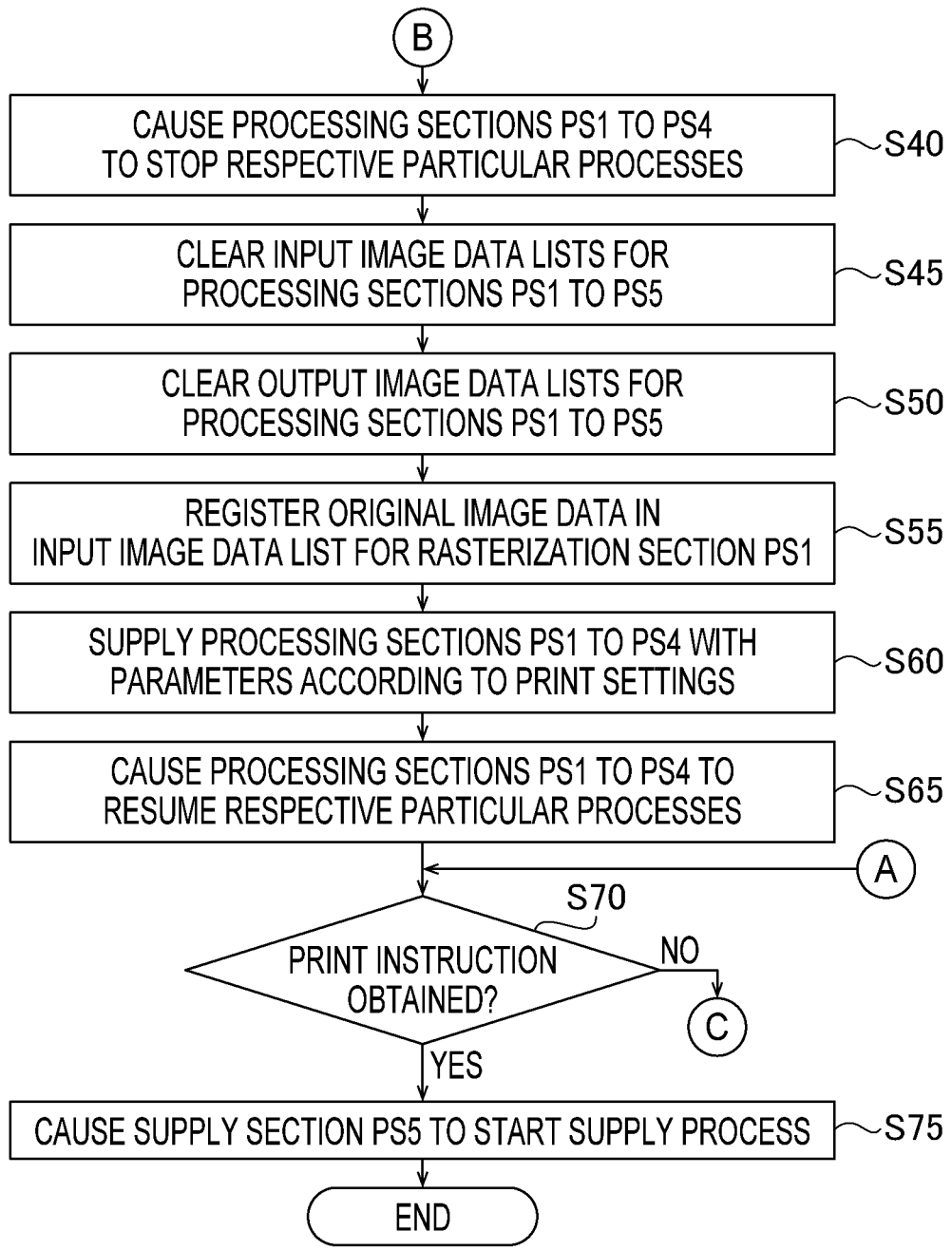

FIGS. 5 and 6 are flowcharts showing a procedure of the printing process. The printing process is performed by the management section CL (see FIG. 2) of the image processor IP1 or IP2 in response to the start instruction from the image processing controller CP. Each printing process corresponds to a specific data selection instruction and a specific print instruction. In other words, each printing process includes generating print data and a print job containing the print data by using the original image data selected by the corresponding data selection instruction, and supplying the print job to the printer 200 in response to the corresponding print instruction.

In S10 (see FIG. 5), the management section CL obtains OS version information, sheet size information, and image size information. The OS version information indicates a version of the OS program OP. The sheet size information indicates a size of sheets to be used for printing. The image size information indicates a size (e.g., the number of pixels) of an image to be printed. For instance, the OS version information is obtained from the OS. The sheet size information is specified by the print settings. The size of the image to be printed is calculated based on the sheet size and the print resolution that are specified by the print settings.

In S13, based on the OS version information, the sheet size information, and the image size information, the management section CL determines an execution method to perform a below-mentioned print data generation process to be either a sequential method or a parallel method. The sequential method is a method in which the aforementioned processes by the processing sections PS1 to PS4 to generate the print data are performed sequentially but not in parallel. The parallel method is a method in which at least some of the aforementioned processes by the processing sections PS1 to PS4 to generate the print data are performed in parallel.

In the illustrative embodiment, when all of the following conditions (1) to (3) are satisfied, the execution method is determined to be the parallel method. When at least one of the conditions (1) to (3) is not satisfied, the execution method is determined to be the sequential method.

Condition (1): The OS version is equal to or later than a reference version.

Condition (2): The sheet size is smaller than a reference sheet size (e.g., A3 in the illustrative embodiment).

Condition (3): The image size is equal to or smaller than a reference image size (e.g., the number of pixels equivalent to an image size of 600 dpi for A4 size in the illustrative embodiment).

A reason why the OS version is used for the condition (1) is that if the OS version is old, the stability and the processing speed of the parallel processing may not be sufficiently high. A reason why the sheet size and the image size are used for the conditions (2) and (3), respectively is that if the sheet size or the image size is excessively large, a processing load for the parallel processing may be excessively large. In these cases, since the stability of the parallel processing may be reduced, or the processing speed of the parallel processing may be reduced, it may be infeasible to achieve a higher processing speed as an advantage of adopting the parallel method. Thus, in these cases, it is preferable to adopt the sequential method.

In S15, the management section CL registers the original image data selected by the data selection instruction corresponding to the printing process, in the input image data list for the rasterization section PS1. In S17, the management section CL determines parameters according to the print settings, for the processing sections PS1 to PS4, and supplies the parameters to processing sections PS1 to PS4.

In S20, the management section CL causes the processing sections PS1 to PS4 to start their respective particular processes. The respective particular processes by the processing sections PS1 to PS4 will be described later. The timing at which each of the processing sections PS1 to PS4 actually performs processing differs depending on whether the execution method to perform the print data generation process is the parallel method or the sequential method. This will be described later.

In S25, the management section CL determines whether a print condition change instruction has been obtained. The print condition change instruction contains the data change instruction obtained via the image selection screen WI2 and the print setting change instruction obtained via the print setting screen WI3.

When determining that the print condition change instruction has not been obtained (S25: No), the management section CL proceeds to S70. Meanwhile, when determining that the print condition change instruction has been obtained (S25: Yes), the management section CL proceeds to S30.

In S30, the management section CL determines whether to change the execution method determined in S13, based on the print condition change instruction. Specifically, when the sheet size or the image size is changed by the print condition change instruction, the management section CL re-determines the execution method to be either the parallel method or the sequential method. When the execution method re-determined is different from the execution method determined in S13, the management section CL determines to change the execution method. When none of the sheet size and the image size is changed, and the execution method re-determined is identical to the execution method determined in S13, the management section CL determines to not change the execution method.

When determining to change the execution method (S30: Yes), in S35, the management section CL changes the execution method to perform the print data generation process to the execution method re-determined based on the print condition change instruction. When determining to not change the execution method (S30: No), the management section CL skips S35.

In S40 (see FIG. 6), the management section CL causes the processing sections PS1 to PS4 to stop their respective particular processes. In S45, the management section CL clears the input image data lists IL1 to IL5 for the processing sections PS1 to PS5. In S50, the management section CL clears the output image data lists OL1 to OL5 for the processing sections PS1 to PS5. Thereby, the input image data lists IL1 to IL5 and the output image data lists OL1 to OL5 are brought into a state where no image data is registered.

In S55, the management section CL registers the original image data selected by the data selection instruction corresponding to the printing process, in the input image data list IL1 for the rasterization section PS1. When the data change instruction has been obtained, the original image data changed in response to the data change instruction is registered. In S60, the management section CL determines parameters according to the print settings, for the processing sections PS1 to PS4, and supplies the parameters to the processing sections PS1 to PS4. When the print setting change instruction has been obtained, the parameters after the print settings have been changed in response to the print setting change instruction are supplied to the processing sections PS1 to PS4.

In S65, the management section CL causes the processing sections PS1 to PS4 to resume their respective particular processes. The processing sections PS1 to PS4 perform their respective particular processes, which will be described later, from the beginning again.

In S70, the management section CL determines whether a print instruction has been obtained via the main screen WI1. When determining that a print instruction has not been obtained via the main screen WI1 (S70: No), the management section CL goes back to S25 (see FIG. 5). When determining that a print instruction has been obtained via the main screen WI1 (S70: Yes), in S75, the management section CL causes the supply section PS5 to start the supply process. From this point in time, a print job containing print data generated through the processing sections PS1 to PS4 is sent to the printer 200. After S75, the management section CL terminates the printing process.

As understood from the above description, from when the data selection instruction has been obtained until when the corresponding print instruction is obtained, the print condition change instruction is allowed to be input for printing based on the data selection instruction. However, after the print instruction has been obtained, the print condition change instruction is not allowed to be input. In other words, in response to the input of the print instruction, the print conditions are fixed for printing based on the corresponding data selection instruction.

A-3-3. Processing by Processing Sections PS1 to PS5

Figure 7:
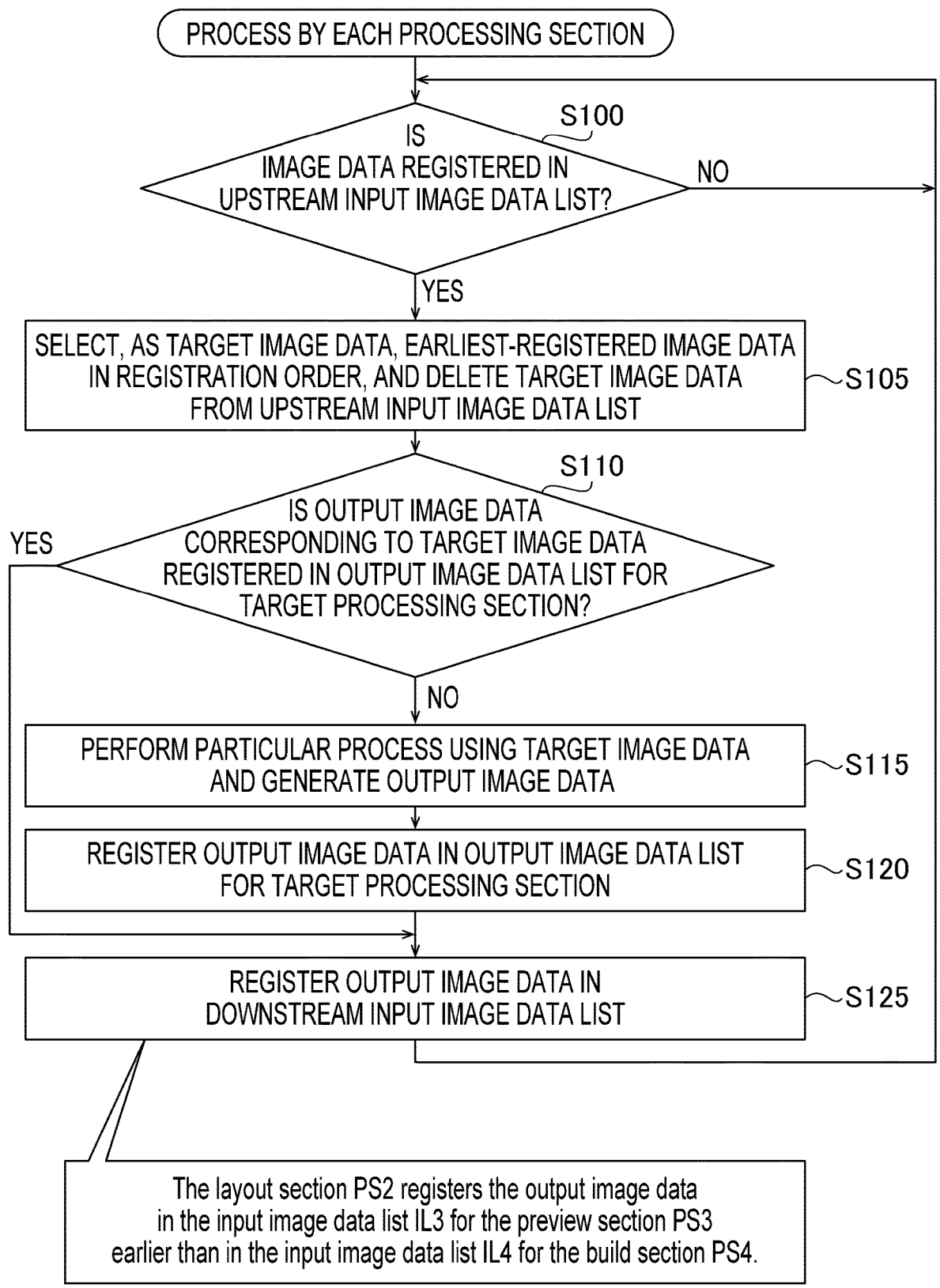
FIG. 7 is a flowchart showing a procedure of a particular process to be performed by each of processing sections PS1 to PS5.

The particular processes to be performed by the processing sections PS1 to PS5 under control of the management section CL will be described. FIG. 7 is a flowchart showing a procedure of the particular process to be performed by each processing section PS1 to PS5. The respective particular processes by the processing sections PS1 to PS5 have many operations in common. Therefore, the respective particular processes by the processing sections PS1 to PS5 will be described together, pointing out differences among them as appropriate. The input image data list in which the input image data to a processing section is registered may also be referred to as the "upstream input image data list." The input image data list in which the output image data from a processing section is registered may also be referred to as the "downstream input image data list." For instance, the upstream input image data list of the rasterization section PS1 is the input image data list IL1. The downstream input image data list of the rasterization section PS1 is the input image data list IL2. The upstream input image data lists of the preview section PS3 and the supply section PS5 exist as the input image data lists IL3 and IL5, respectively. However, the downstream input image data lists of the preview section PS3 and the supply section PS5 do not exist.

The process shown in FIG. 7 is started in response to a start instruction from the management section CL. In S100, a target processing section (i.e., one of the processing sections PS1 to PS5) determines whether the input image data to the target processing section itself is registered in the upstream input image data list.

Figure 8A:
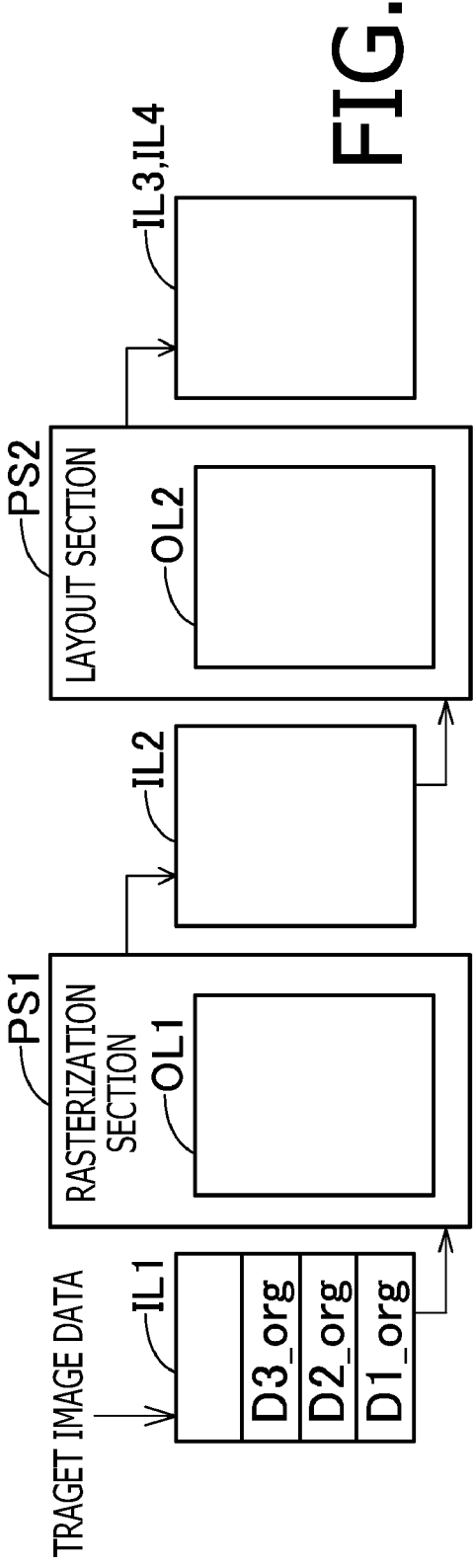

FIGS. 8A to 8D illustrate the particular processes by the rasterization section PS1 and the layout section PS2. FIGS. 8A to 8D show a state of each list of the input image data lists IL1 to IL4 and the output image data lists OL1 and OL2 at a plurality of points in time in the particular processes by the rasterization section PS1 and the layout section PS2. FIGS. 8A to 8D show an example in which three pieces of original image data D1_org, D2_org, and D3_org are selected. FIG. 8A shows the state of each list at a point in time when the rasterization process is started. In the state shown in FIG. 8A, the three pieces of original image data D1_org, D2_org, and D3_org are registered in the input image data list IL1. The three pieces of original image data D1_org, D2_org, and D3_org are registered in the input image data list IL1 by the management section CL (see S15 in FIG. 5, and S55 in FIG. 6). No image data is registered in the other lists IL2 to IL4, OL1, and OL2. In this state, the rasterization section PS1 determines that the input image data is registered in the upstream input image data list IL1. The layout section PS2 determines that no input image data is registered in the upstream input image data list IL2.

When determining that the input image data to the target processing section itself is registered in the upstream input image data list (S100: Yes), the target processing section proceeds to S105. Meanwhile, when determining that the input image data to the target processing section itself is not registered in the upstream input image data list (S100: No), the target processing section waits until the input image data to the target processing section itself is registered in the upstream input image data list.

In S105, the target processing section selects, as target image data, the earliest-registered image data in a registration order from among the input image data registered in the upstream input image data list IL1, and deletes the target image data from the upstream input image data list IL1. For instance, in the example shown in FIG. 8A, the rasterization section PS1 selects the original image data D1_org as the target image data, and deletes the original image data D1_org from the input image data list IL1.

In S110, the target processing section determines whether the output image data corresponding to the target image data is registered in the output image data list for the target processing section itself. The output image data corresponding to the target image data is image data generated by the target processing section performing its particular process for the target image data. In the example shown in FIG. 8A, converted image data D1_conv corresponding to the original image data D1_org is not registered in the output image data list OL1. Therefore, the rasterization section PS1 determines that the output image data corresponding to the target image data is not registered in the output image data list OL1 of the rasterization section PS1 itself.

When determining that the output image data corresponding to the target image data is not registered in the output image data list for the target processing section (S110: No), in S115, the target processing section performs its particular process using the target image data, thereby generating the output image data. The generated output image data is stored in an image file.

In S120, the target processing section registers the output image data generated in S115 in the output image data list for the target processing section itself. More specifically, the target processing section describes a path of the image file containing the generated output image data in the output image data list for the target processing section itself.

When determining that the output image data corresponding to the target image data is registered in the output image data list for the target processing section (S110: Yes), the target processing section proceeds to S125 without executing any of S115 and S120.

In S125, the target processing section registers the output image data generated in S115 in the downstream input image data list. After S125, the target processing section goes back to S110.

When the target processing section is the layout section PS2, the target processing section has, as the downstream input image data lists, the input image data list IL3 for the preview section PS3 and the input image data list IL4 for the build section PS4. In S125, the layout section PS2 registers the output image data to both of the input image data lists IL3 and IL4. At that time, the layout section PS2 registers the output image data in the input image data list IL3 for the preview section PS3 earlier than in the input image data list IL4 for the build section PS4. This is because generation of the preview image data should be prioritized over generation of the print data, since the user is expected to input a print instruction after checking the preview images PI.

When the target processing section is the preview section PS3 or the supply section PS5, the downstream input image data list does not exist. Therefore, in this case, the target processing section does not execute S125.

Figure 8B:
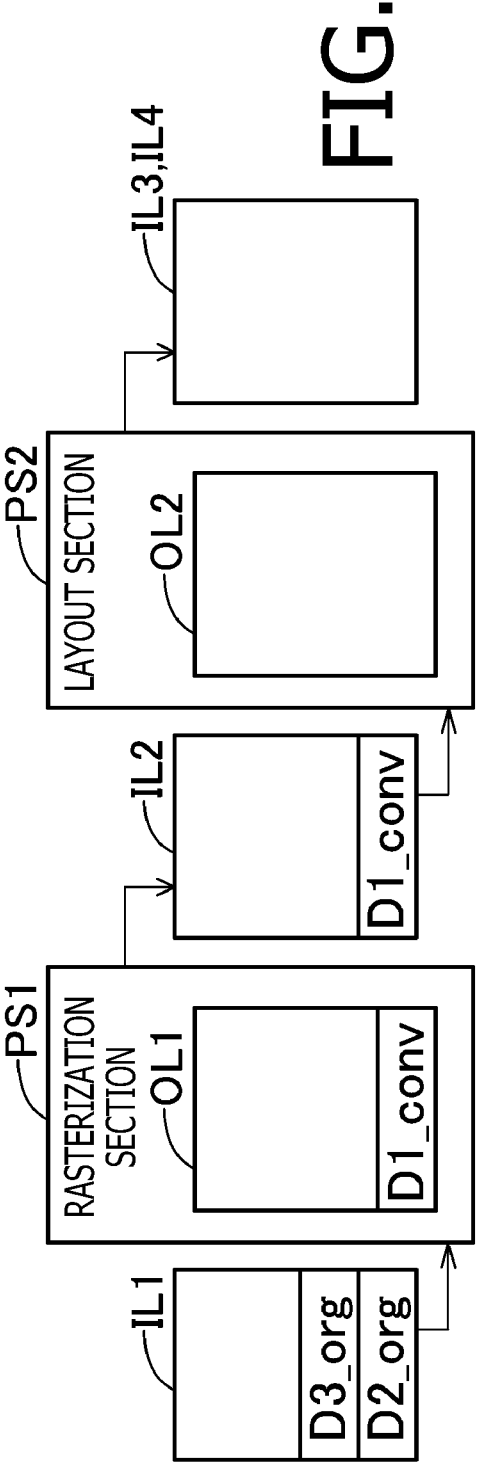

FIG. 8B shows a state of each list of the input image data lists IL1 to IL4 and the output image data lists OL1 and OL2 after the rasterization process using the original image data D1_org has been completed. Namely, FIG. 8B shows the state of each list after the rasterization section PS1 has executed S105 to S125 (see FIG. 7) with the original image data D1_org as the target image data. At this point in time, the original image data D1_org is deleted from the input image data list IL1 for the rasterization section PS1 (S105). In the output image data list OL1 of the rasterization section PS1, the converted image data D1_conv, which is the output image data corresponding to the original image data D1_org, is registered (S120). The converted image data D1_conv is also registered in the downstream input image data list IL2 of the rasterization section PS1. In other words, the converted image data D1_conv is also registered in the upstream input image data list IL2 of the layout section PS2. Thereby, from this point in time, the layout section PS2 is ready to execute S105 to S125 (see FIG. 7) with the converted image data D1_conv as the target image data.

A-3-4. Execution Method for Print Data Generation Process

Figure 9:
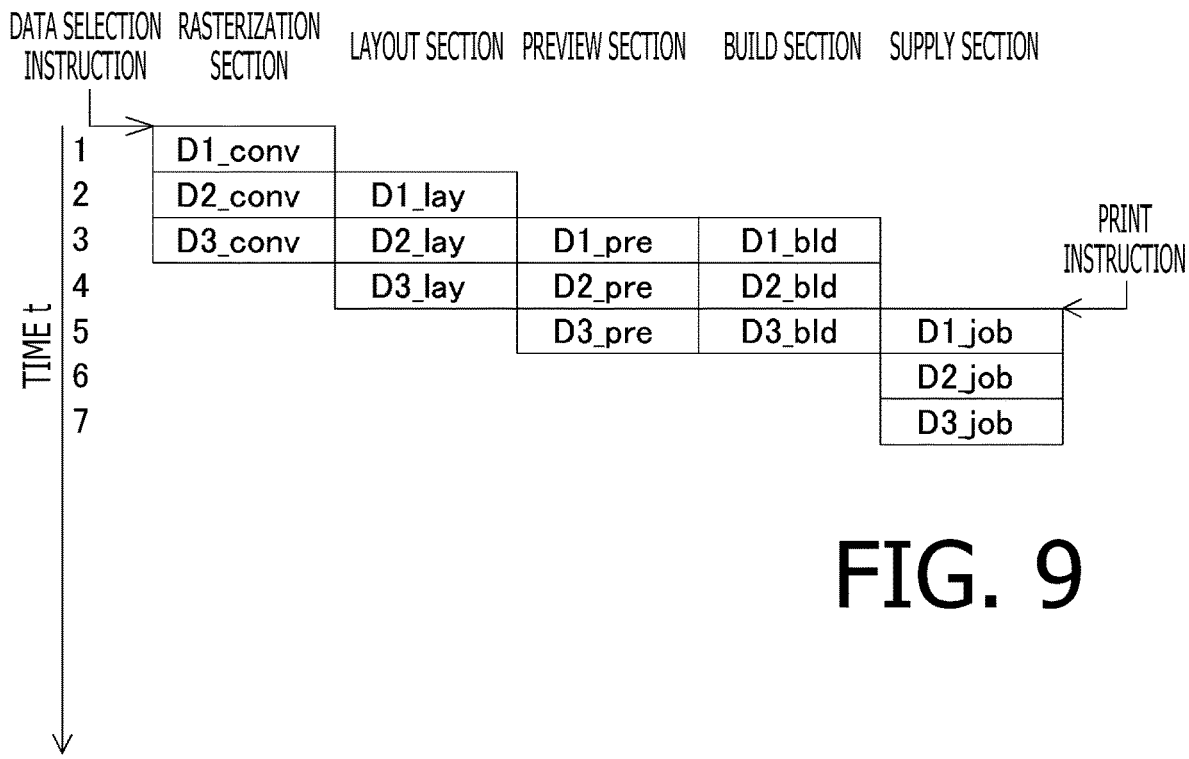
FIG. 9 shows an illustration of a parallel method.
Figure 10:
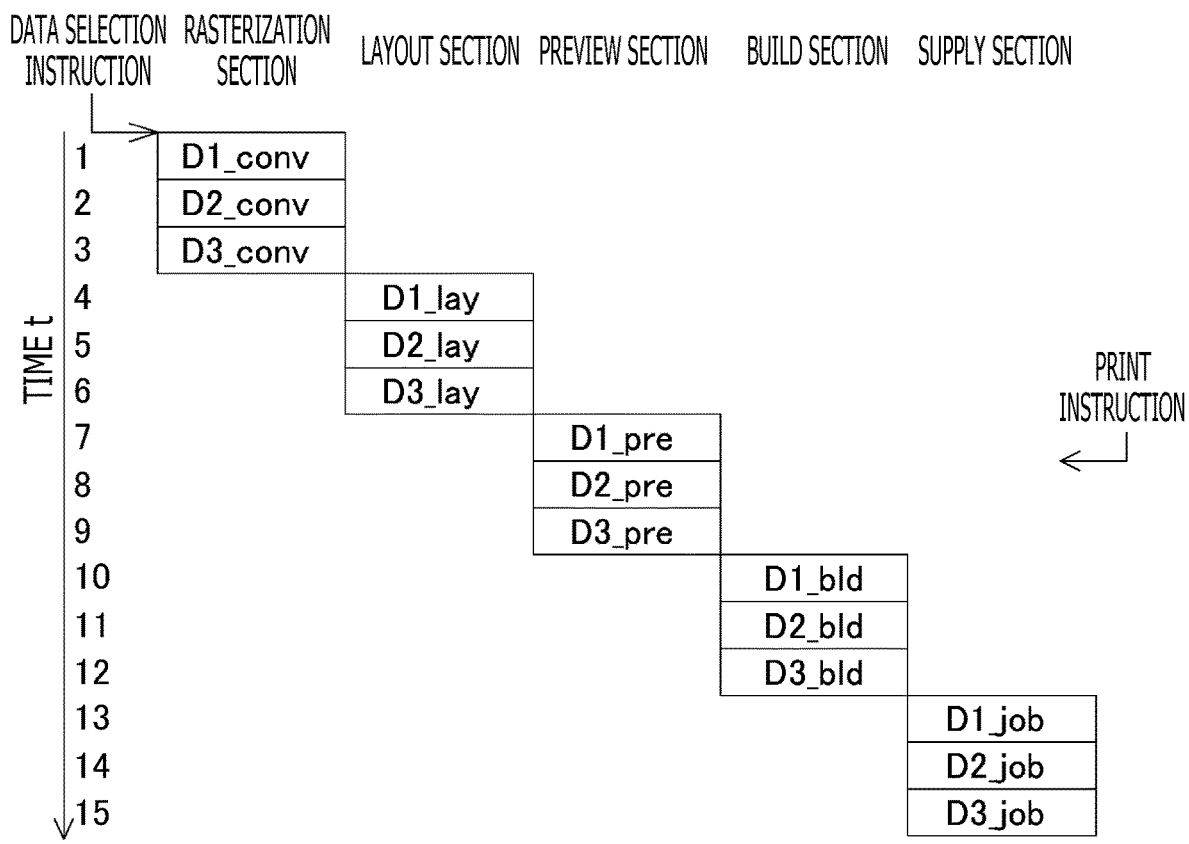
FIG. 10 shows an illustration of a sequential method.

Subsequently, the parallel method and the sequential method, which are the execution methods to perform the print data generation process, will be described. FIG. 9 shows an illustration of the parallel method. FIG. 10 shows an illustration of the sequential method. In each of FIGS. 9 and 10, a vertical axis represents a time t. Each of the numbers arranged along the axis of the time t is an identifier provided to a period during which one or more processes are performed. The numbers as the identifiers are provided in chronological order. In FIGS. 9 and 10, each of the rectangles arranged below the name of each processing section PS1 to PS5 indicates the content of the process performed by each processing unit PS1 to PS5 and the period during which the process is performed. For instance, in FIG. 9, a rectangle for the rasterization section PS1 is shown in a position corresponding to the period 1 in the vertical direction, and has "D1_conv" described therein. This means that during the period 1, the rasterization section PS1 performs the rasterization process to generate the converted image data D1_conv.

Here, the converted image data D1_conv, layout image data D1_lay, preview image data D1_pre, print data D1_bld, and print job D1_job are all image data generated using the original image data D1_org. For this reason, it may be said that these pieces of image data D1_conv, D1_lay, D1_pre, D1_bld, and D1_job are all image data corresponding to the original image data D1_org. The converted image data D1_conv and the layout image data D1_lay are both temporarily generated in the process of generating the preview image data D1_pre and the print data D1_bld. Hence, these pieces of image data D1_conv and D1_lay may also be referred to as "intermediate image data."

A-3-4-1. Parallel Method

In the parallel method, the processing sections PS1 to PS5 operate asynchronously with each other, after the processing sections PS1 to PS5 have been caused to start their respective particular processes by the management section CL in each of the steps S20, S65, and S75. For instance, the processing sections PS1 to PS5 are executed as mutually-different threads in so-called multi-thread processing. Therefore, each processing section PS1 to PS5 performs its particular process using the input image data immediately after the input image data has been registered in the input image data list for each processing section PS1 to PS5. In the parallel method, at least some of the respective particular processes by the processing sections PS1 to PS4 are performed in parallel during at least a partial period.

When a data selection instruction to select the original image data D1_org, D2_org, and D3_org has been input, the four processing sections PS1 to PS4, except for the supply section PS5, start their respective particular processes (S20 in FIG. 5). At the beginning of the period 1 in FIG. 9, as shown in FIG. 8A, the input image data is registered only in the input image data list IL1. Hence, only the rasterization section PS1 is allowed to perform its particular process. Therefore, during the period 1 in FIG. 9, only the rasterization process to generate the converted image data D1_conv is performed.

At the end of the period 1 in FIG. 9, the converted image data D1_conv is generated, and is registered in the input image data list IL2, as shown in FIG. 8B. Therefore, during the period 2, the rasterization section PS1 and the layout section PS2 may perform their respective particular processes in parallel. For instance, during the period 2 in FIG. 9, the rasterization process by the rasterization section PS1 to generate the converted image data D2_conv, and the layout process by the layout section PS2 to generate the layout image data D1_lay are performed in parallel.

FIG. 8C shows a state of each list of the input image data lists IL1 to IL4 and the output image data lists OL1 and OL2 at the end of the period 2 in FIG. 9, i.e., at a point in time when the rasterization process to generate the converted image data D2_conv, and the layout process to generate the layout image data D1_lay have been completed. At this point in time, the original image data D3_org is registered in the input image data list IL1, the converted image data D2_conv is registered in the input image data list IL2, and the layout image data D1_lay is registered in the input image data lists IL3 and IL4. Hence, at this point in time, the processing sections PS1 to PS4 are ready to perform their respective particular processes in parallel. Therefore, during the period 3 in FIG. 9, the rasterization process to generate the converted image data D3_conv, the layout process to generate the layout image data D2_lay, the preview process to generate the preview image data D1_pre, and the build process to generate the print data D1_bld are performed in parallel.

Furthermore, during the period 4 in FIG. 9, the layout process to generate the layout image data D3_lay, the preview process to generate the preview image data D2_pre, and the build process to generate the print data D2_bld are performed in parallel. During the period 5 in FIG. 9, the preview process to generate the preview image data D3_pre, and the build process to generate the print data D3_bld are performed in parallel. Then, at the end of the period 5, the generation of the print data D1_bld, D2_bld, and D3_bld corresponding to all the original image data D1_org, D2_org, and D3_org is completed. Thus, in the parallel process, the number of periods required to generate the print data using the three pieces of original image data is five.

Unlike the particular processes by the processing sections PS1 to PS4, the supply process by the supply section PS5 is started from a point in time when the print instruction is obtained (S75 in FIG. 6). The supply process by the supply section PS5 is performed as a thread different from the particular processes by the processing sections PS1 to PS4, asynchronously with the particular processes by the processing sections PS1 to PS4. Therefore, the supply process by the supply section PS5 is performed in parallel with the particular processes by the processing sections PS1 to PS4.

FIG. 9 shows an example in which the print instruction is obtained at the end of the period 4 (i.e., at the beginning of the period 5). At this point in time, the two pieces of print data D1_bld and D2_bld have already been generated. Hence, the supply section PS5 may immediately start the supply process. In the example shown in FIG. 9, during the periods 5, 6, and 7, the supply section PS5 performs the supply processes to generate the print jobs D1_job, D2_job, and D3_job, respectively. Therefore, during the period 5, the supply process to supply the print job D1_job is performed in parallel with the preview process to generate the preview image data D3_pre and the build process to generate the print data D3_bld.

A-3-4-2. Sequential Method

In the sequential method, after the particular processes by the processing sections PS1 to PS2 have been started by the management section CL, for instance, in S20, S65, or S75 (see FIGS. 5 and 6), the processing sections PS1 to PS5 sequentially operate under control of the management section CL. For instance, all the particular processes by the processing sections PS1 to PS5 are performed as a single thread. Therefore, the particular process by one processing section (e.g., PS1) and the particular processes by the other processing sections (e.g., PS2 to PS5) are not allowed to be performed in parallel.

For instance, at the end of the period 1 in FIG. 10, the converted image data D1_conv is generated and registered in the input image data list IL2, as shown in FIG. 8B. Hence, at the beginning of the period 2, the layout section PS2 is ready to start the layout process. Even in this state, in the sequential method of the illustrative embodiment, the layout section PS2 does not start the layout process until the generation of all the converted image data D1_conv, D2_conv, and D3_conv is completed. The layout section PS2 starts the layout process after all pieces of the converted image data D1_conv, D2_conv, and D3_conv have been generated.

FIG. 8D shows a state of each list of the input image data lists IL1 to IL4 and the output image data lists OL1 and OL2 at the end of the period 3 in FIG. 10, i.e., at a point in time when all pieces of the converted image data D1_conv, D2_conv, and D3_conv have been generated. In the example shown in FIG. 8D, all pieces of the converted image data D1_conv, D2_conv, and D3_conv have been generated and registered in the input image data list IL2. However, the layout section PS2 does not perform the layout process. In the sequential method, the layout section PS2 sequentially performs the respective layout processes to generate the layout image data D1_lay, D2_lay, and D3_lay during the periods 4, 5, and 6 (see FIG. 10).

After all pieces of the layout image data D1_lay, D2_lay, and D3_lay have been generated, the preview process and the build process are both executable. In the illustrative embodiment, however, the preview process is prioritized over the build process. This is because, as described above, it is preferable to display the preview images PI promptly, since the user is considered to input, in most cases, the print instruction after checking the preview images PI. Therefore, as shown in FIG. 10, during the periods 7, 8, and 9 after all pieces of the layout image data D1_lay, D2_lay, and D3_lay have been generated, the preview section PS3 sequentially performs the respective preview processes to generate the preview image data D1_pre, D2_pre, and D3_pre. During the periods 10, 11, and 12 after all pieces of the preview image data D1_pre, D2_pre, and D3_pre have been generated, the build section PS4 sequentially performs the respective build processes to generate the print data D1_bld, D2_bld, and D3_bld.

In the illustrative embodiment, the supply process by the supply section PS5 is started after all the print data has been generated and the print instruction has been obtained. For instance, even though the print instruction has been obtained, and an instruction to start the supply process has been received from the management section CL (S75 in FIG. 6), when not all of the print data has been generated at that point in time, the supply section PS5 does not start the supply process until all the print data is generated.

FIG. 10 shows an example in which a print instruction is obtained at the end of the period 7 (i.e., at the beginning of the period 8). At this point in time, the supply section PS5 does not start the supply process. The supply section PS5 sequentially performs the respective supply processes to supply the print jobs D1_job, D2_job, and D3_job, during the periods 13, 14, and 15 after all pieces of the print data D1_bld, D2_bld, and D3_bld have been generated.

In the parallel method, for instance, when available amounts of resources (e.g., memory capacity) are sufficient for a processing load (e.g., a size of image data to be processed), and the parallel processing is efficiently executable, the print jobs are generated and supplied at a higher speed than in the sequential method. In the sequential method, for instance, even when the available amounts of resources are not sufficient for the processing load, and the parallel processing is not efficiently executable, the print jobs are stably generated and supplied.

When the print condition change instruction has been obtained (S25: Yes, in FIG. 5) after obtainment of the data selection instruction and before obtainment of the print instruction, the processing sections PS1 to PS4 are caused to stop their respective particular processes (S40 in FIG. 6). Then, after the input image data lists IL1 to IL5 and the output image data lists OL1 to OL5 have been cleared (S45 and S55 in FIG. 6), the generation of the image data through the processing sections PS1 to PS4 according to the print condition change instruction is performed again (S60 and S65 in FIG. 6). In this case, the processes of generating the print data as shown in FIGS. 9 and 10 are performed again from the beginning.

According to the illustrative embodiment described above, the UI processor UP obtains the data selection instruction input by the user, and obtains the print instruction corresponding to the data selection instruction (see FIG. 3B). The print instruction is input by the user after the data selection instruction is input. The processing sections PS1, PS2, and PS4 generate the print data D1_bld, D2_bld, and D3_bld using the original image data D1_org, D2_org, and D3_org selected based on the data selection instruction (see S15 to S20 in FIG. 5, and FIGS. 7, 9, and 10). The supply section PS5 supplies the print data D1_bld, D2_bld, and D3_bld to the printer 200 (see S75 in FIG. 6, and FIGS. 7, 9, and 10). The processing sections PS1 to PS4 start generating the print data D1_bld, D2_bld, and D3_bld after the data selection instruction has been obtained and before the print instruction is obtained (see S2 to S4 in FIG. 4, and FIGS. 9 and 10). The supply section PS5 does not start supplying the print data D1_bld, D2_bld, and D3_bld even when the generation of the print data D1_bld, D2_bld, and D3_bld has been completed before the print instruction is obtained. The supply section PS5 starts supplying the print data D1_bld, D2_bld, and D3_bld after the print instruction has been obtained (see S70 and S75 in FIG. 6, and FIGS. 9 and 10). As a result, it is possible to prevent, from becoming longer, a time from when the terminal device 300 has received the print instruction input by the user until when the terminal device 300 causes the printer 200 to start printing. For instance, even while the user is checking the preview images PI, the terminal device 300 (more specifically, the processing sections PS1 to PS4) may proceed with generating the print data D1_bld, D2_bld, and D3_bld. Therefore, it is possible to supply the print data D1_bld, D2_bld, and D3_bld to the printer 200 more promptly than when the generation of the print data is started after obtainment of the print instruction. Accordingly, it is possible to cause the printer 200 to start printing more promptly. Furthermore, even when the terminal device 300 has completed generating the print data D1_bld, D2_bld, and D3_bld before obtaining the print instruction, the terminal device 300 does not start supplying the print data D1_bld, D2_bld, and D3_bld. Hence, it is possible to prevent printing of an image unintended by the user.

Further, according to the illustrative embodiment, the processing sections PS1 to PS3 generate the preview image data D1_pre, D2_pre, and D3_pre using the original image data D1_org, D2_org, and D3_org selected based on the data selection instruction (see FIGS. 9 and 10). The UI processor UP causes the display 370 to display the preview images PI using the preview image data D1_pre, D2_pre, and D3_pre after obtainment of the data selection instruction and before obtainment of the print instruction (see FIG. 3A). The generation of the preview image data D1_pre, D2_pre, and D3_pre is performed in priority to the generation of the print data D1_bld, D2_bld, and D3_bld. For instance, in the sequential method, as shown in FIG. 10, the generation of the preview image data D1_pre, D2_pre, and D3_pre is performed earlier than the generation of the print data D1_bld, D2_bld, and D3_bld. In addition, the layout section PS2 registers the layout image data D1_lay, D2_lay, and D3_lay in the input image data list IL3 for the preview section PS3 earlier than the registration of the layout image data D1_lay, D2_lay, and D3_lay in the input image data list IL4 for the build section PS4 (see FIG. 7). As a result, even in the parallel method, the generation of the preview image data is performed in priority to the generation of the print data. Consequently, it is possible to promptly display the preview images PI after obtainment of the data selection instruction and before obtainment of the print instruction. Thus, for instance, the user is allowed to promptly check print images in advance by viewing the preview images PI before inputting the print instruction.

Further, in the illustrative embodiment, the plurality of image processors IP1 and IP2 may perform the printing processes (see FIGS. 5 and 6) in parallel. It is noted that the number of the image processors is equal to or less than the upper limit number Nmax. Namely, the terminal device 300 (more specifically, the image processors IP1 and IP2) may perform in parallel a first printing process to cause the printer 200 to perform printing according to a first data selection instruction and a first print instruction corresponding to the first data selection instruction, and a second printing process to cause the printer 200 to perform printing according to a second data selection instruction and a second print instruction corresponding to the second data selection instruction (see S2 to S4 in FIG. 4). Specifically, the image processor IP1 starts generating first print data after obtainment of the first data selection instruction and before obtainment of the first print instruction. The image processor IP2 starts generating second print data after obtainment of the second data selection instruction and before obtainment of the second print instruction. When the second data selection instruction has been obtained before the generation of the first print data is completed, a print data generation process to generate the first print data and a print data generation process to generate the second print data are performed in parallel. Consequently, it is possible to prevent, from becoming longer, a time from when the terminal device 300 has received the second print instruction until when the terminal device 300 causes the printer 200 to start printing in accordance with the second print instruction.

Further, in the illustrative embodiment, the management section CL sets the upper limit number Nmax of the printing processes executable in parallel (S1 in FIG. 4). The management section CL sets the upper limit number Nmax based on information regarding the resources available for the printing processes, specifically, based on the remaining memory capacity Mr. Consequently, it is possible to appropriately set the upper limit number Nmax. Therefore, by performing a plurality of printing processes in parallel, it is possible to reduce a total time required for the plurality of printing processes and to prevent failures (e.g., stopping of the printing processes) caused by performing an excessive number of printing processes in parallel.

Here, the whole of the three pieces of original image data D1_org, D2_org, and D3_org is set as target image data. Further, the one piece of original image data D1_org among the target image data is set as first partial data. The other two pieces of original image data D2_org and D3_org are set as second partial data. In the illustrative embodiment, the print data generation process includes the layout processes to generate the layout image data D1_lay, D2_lay, and D3_lay corresponding to the target image data, and the build processes to generate the print data D1_bld, D2_bld, and D3_bld using the layout image data D1_lay, D2_lay, and D3_lay.

In the parallel method shown in FIG. 9, the layout section PS2 performs the layout process corresponding to the first partial data (see the period 2 in FIG. 9), and then performs the layout process corresponding to the second partial data (see the periods 3 and 4 in FIG. 9). The build process corresponding to the first partial data (see the period 3 in FIG. 9) is performed in parallel with the layout process corresponding to the second partial data (see the periods 3 and 4 in FIG. 9). When the print instruction has been obtained before completion of the build process corresponding to the second partial data (see the periods 4 and 5 in FIG. 9), the supply section PS5 performs the supply process to supply the printer 200 with the print job D1_job containing the print data D1_bld corresponding to the first partial data (see the period 5 in FIG. 9) in parallel with the build process for the second partial data by the build section PS4. As a result, it is possible to efficiently perform the generation and the supply of the print data.

Figure 12:
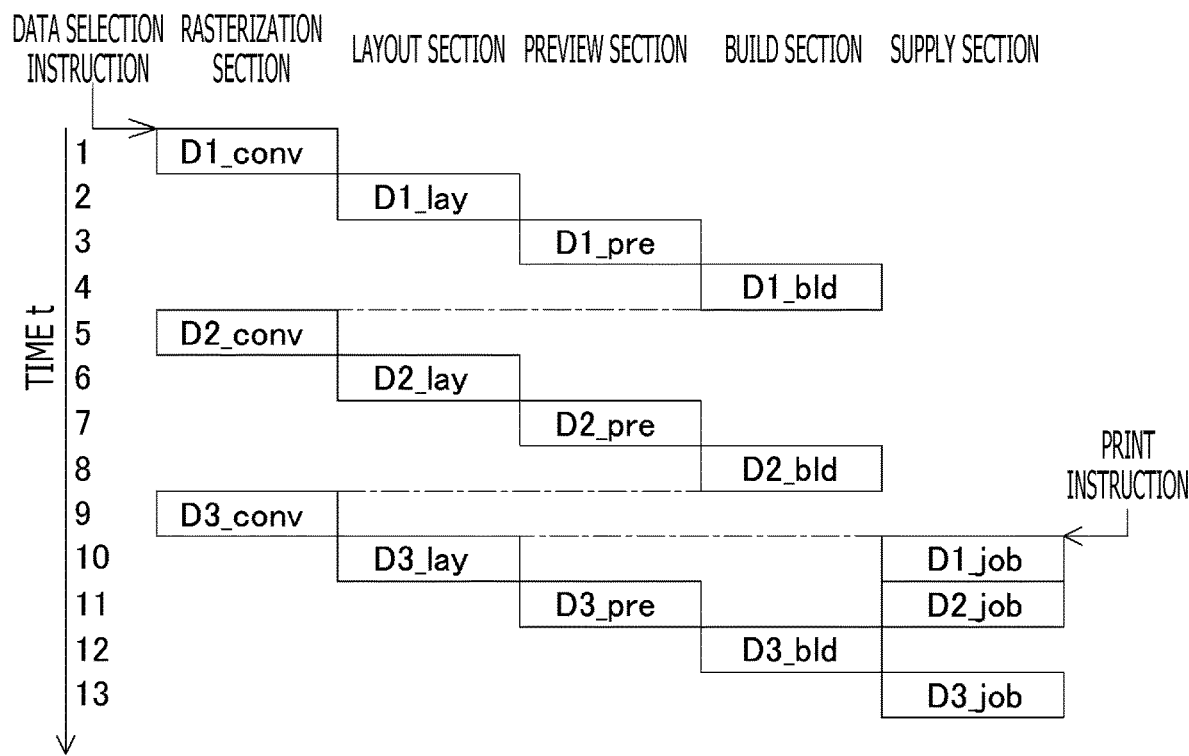
FIG. 12 shows an illustration of yet another sequential method.

In the sequential method shown in FIG. 10, each process (e.g., the layout process and the build process corresponding to the first partial data, and the layout process and the build process corresponding to the second partial data) included in the print data generation process is sequentially performed (see the periods 1 to 12 in FIG. 12). When the print instruction has been obtained before completion of the print data generation process, the supply section PS5 performs the supply processes to supply the printer 200 with the print jobs D1_job, D2_job, and D3_job that contain the print data (see the periods 13 to 15 in FIG. 10) after completion of the print data generation process. As a result, each process included in the print data generation process is performed sequentially for each partial data. Then, after completion of the print data generation process, the supply processes to supply the print jobs containing the print data are performed. Thereby, it is possible to prevent a processing load for generating and supplying the print data from becoming excessively large.

Further, when the print condition change instruction has been obtained (S25: Yes, in FIG. 5) after obtainment of the data selection instruction and before obtainment of the print instruction, the generation of the print data D1_bld, D2_bld, and D3_bld is performed again according to the print condition change instruction (S40 to S65 in FIG. 6). As a result, the user is allowed to change the print conditions after obtainment of the data selection instruction and before obtainment of the print instruction. Accordingly, even when the user changes the print conditions, it is possible to generate appropriate print data according to the changed print conditions.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of its versatility are shown and described in the present disclosure. It is to be understood that aspects of the present disclosure are capable of use in various other combinations and environments and are capable of changes or modifications within the scope of the inventive concept as expressed herein.

B. Modifications

Figure 11:
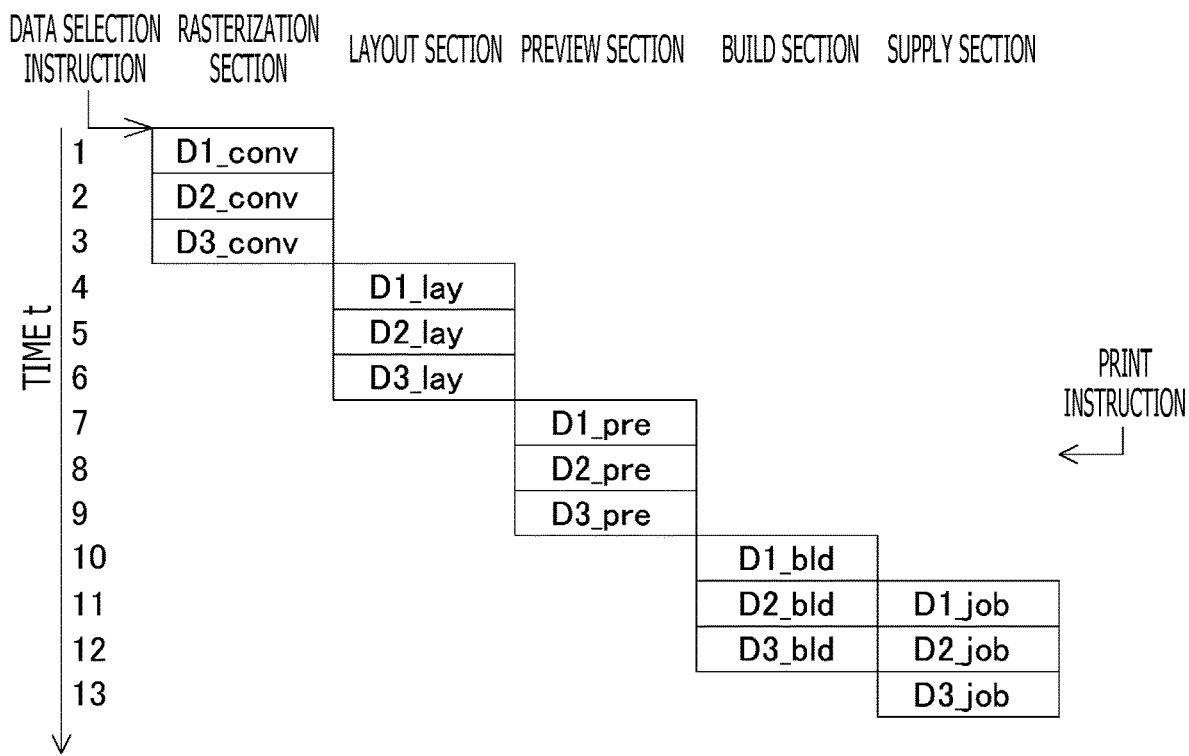
FIG. 11 shows an illustration of another sequential method.

FIG. 11 shows a first illustration of a sequential method in a modification according to aspects of the present disclosure. In the modification shown in FIG. 11, in substantially the same manner as in the sequential method (see FIG. 10) of the aforementioned illustrative embodiment, the respective particular processes by the processing sections PS1 to PS4 to generate the print data are not allowed to be performed in parallel. In the modification shown in FIG. 11, unlike in the sequential method (see FIG. 10) of the illustrative embodiment, the supply process by the supply section PS5 is allowed to be performed in parallel with the particular processes by the processing sections PS1 to PS4. The supply process by the supply section PS5 includes generating a print job with a print command added and sending the generated print job to the printer 200. A processing load for the supply process by the supply section PS5 is lower than for the particular processes by the processing sections PS1 to PS4 that may include relatively complex image processing. Therefore, even if the supply process by the supply section PS5 is performed in parallel with the particular processes by the processing sections PS1 to PS4, it is unlikely that an overall processing load in that case will be excessively high.

For instance, FIG. 11 shows an example in which the print instruction is obtained before the generation of all the print data D1_bld, D2_bld, and D3_bld is completed. In this case, after the print data D1_bld corresponding to the original image data D1_org has been generated, the supply section PS5 performs the supply process to supply the printer 200 with the print job D1_job containing the print data D1_bld, in parallel with the build process by the build section PS4 to generate the print data D2_bld (see the period 11 in FIG. 11). Then, after the print data D2_bld corresponding to the original image data D2_org has been generated, the supply section PS5 performs the supply process to supply the printer 200 with the print job D2_job containing the print data D2_bld, in parallel with the build process by the build section PS4 to generate the print data D3_bld (see the period 12 in FIG. 11).

According to the modification described above, when the print instruction has been obtained before completion of the print data generation process, one or more pieces of data already generated among all the print data to be supplied are supplied to the printer 200 in parallel with the print data generation process. Therefore, it is possible to start supplying the print jobs more promptly than in the sequential method of the aforementioned illustrative embodiment. As a result, the printer 200 is enabled to start printing more promptly.

FIG. 12 shows a second illustration of a sequential method in another modification according to aspects of the present disclosure. In the modification shown in FIG. 12, in substantially the same manner as in the sequential method of the aforementioned modification shown in FIG. 11, the respective particular processes by the processing sections PS1 to PS4 are not allowed to be performed in parallel. However, the supply process by the supply section PS5 is allowed to be performed in parallel with the particular processes by the processing sections PS1 to PS4.

In the modification shown in FIG. 12, a processing order of the processing sections PS1 to PS4 is different from those in the aforementioned illustrative embodiment shown in FIG. 10 and the aforementioned modification shown in FIG. 11. Specifically, in the modification shown in FIG. 12, the processing sections PS1 to PS4 perform their respective particular processes corresponding to the original image data D2_org, after performing their respective particular processes corresponding to the original image data D1_org. Then, the processing sections PS1 to PS4 perform their respective particular processes corresponding to the original image data D3_org, after performing their respective particular processes corresponding to the original image data D2_org.

Namely, as shown in FIG. 12, the rasterization process to generate the converted image data D1_conv (see the period 1 in FIG. 12), the layout process to generate the layout image data D1_lay (see the period 2 in FIG. 12), the preview process to generate the preview image data D1_pre (see the period 3 in FIG. 12), and the build process to generate the print data D1_bld (see the period 4 in FIG. 12) are performed. Next, the rasterization process to generate the converted image data D2_conv (see the period 5 in FIG. 12), the layout process to generate the layout image data D2_lay (see the period 6 in FIG. 12), the preview process to generate the preview image data D2_pre (see the period 7 in FIG. 12), and the build process to generate the print data D2_bld (see the period 8 in FIG. 12) are performed. Finally, the rasterization process to generate the converted image data D3_conv (see the period 9 in FIG. 12), the layout process to generate the layout image data D3_lay (see the period 10 in FIG. 12), the preview process to generate the preview image data D3_pre (see the period 11 in FIG. 12), and the build process to generate the print data D3_bld (see the period 12 in FIG. 12) are performed.

FIG. 12 shows an example in which the print instruction is obtained after the processing sections PS1 to PS4 have completed their particular processes corresponding to the original image data D1_org and D2_org and before the processing sections PS1 to PS4 complete all of their particular processes corresponding to the original image data D3_org. In this case, the supply section PS5 performs the supply processes to supply the printer 200 with the print job D1_job containing the print data D1_bld, and the print job D2_job containing the print data D2_bld, in parallel with the particular processes corresponding to the original image data D3_org by the processing sections PS1 to PS4. Specifically, in the example shown in FIG. 12, the supply process to supply the print job D1_job is performed in parallel with the layout process to generate the layout image data D3_lay (see the period 10 in FIG. 12). Further, the supply process to supply the print job D2_job is performed in parallel with the preview process to generate the preview image data D3_pre (see the period 11 in FIG. 12).

According to the modification shown in FIG. 12, the generation of the print data D1_bld is completed earlier than in the sequential methods of the aforementioned illustrative embodiment (see FIG. 10) and the aforementioned modification (see FIG. 11). Hence, it is possible to more promptly supply the printer 200 with the print job D1_job containing the print data D1_bld in response to the print instruction. As a result, the printer 200 is enabled to more promptly start printing based on the print job D1_job. The terminal device 300 is enabled to proceed with the print data generation process to generate the print data D3_bld, which is left un-generated, while the printer 200 is performing printing based on the print job D1_job. Consequently, it is possible to reduce, as a whole, a time required from the obtainment of the print instruction until completion of the printing by the printer 200.

Figure 13:
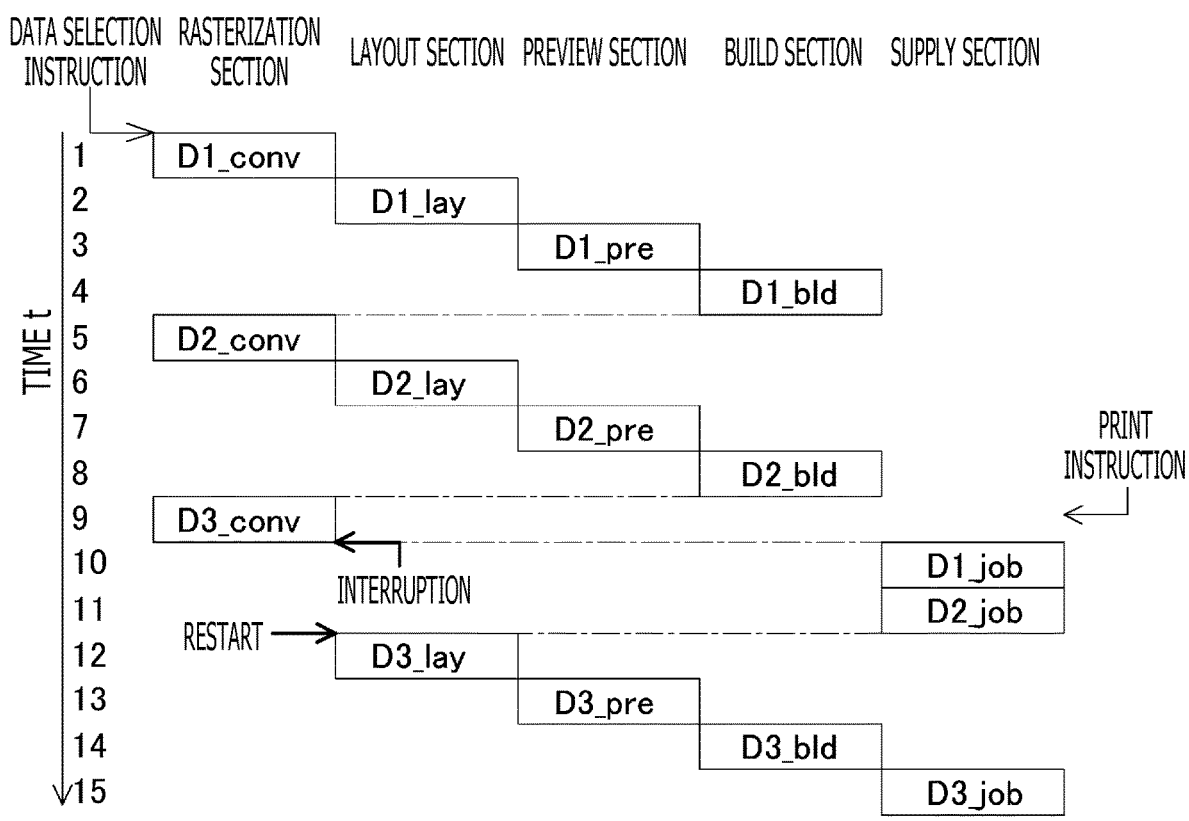
FIG. 13 shows an illustration of yet another sequential method.

FIG. 13 shows a third illustration of a sequential method in yet another modification according to aspects of the present disclosure. In the modification shown in FIG. 13, in substantially the same manner as in the sequential method (see FIG. 10) of the aforementioned illustrative embodiment, the respective particular processes by the processing sections PS1 to PS4 are not allowed to be performed in parallel. Further, the supply process by the supply section PS5 is not allowed to be performed in parallel with the particular processes by the processing sections PS1 to PS4. In the modification shown in FIG. 13, in substantially the same manner as in the sequential method of the aforementioned modification shown in FIG. 12, the processing sections PS1 to PS4 perform their respective particular processes corresponding to the original image data D2_org, after performing their respective particular processes corresponding to the original image data D1_org. Then, the processing sections PS1 to PS4 perform their respective particular processes corresponding to the original image data D3_org, after performing their respective particular processes corresponding to the original image data D2_org.

FIG. 13 shows an example in which the print instruction is obtained after the processing sections PS1 to PS4 have completed their particular processes corresponding to the original image data D1_org and D2_org and before the processing sections PS1 to PS4 complete all of their particular processes corresponding to the original image data D3_org. In this case, unlike in the sequential method of the aforementioned modification shown in FIG. 12, the processing sections PS1 to PS4 interrupt their particular processes corresponding to the original image data D3_org before completion of all the particular processes (see FIG. 13). Then, the supply section PS5 performs the supply processes to supply the printer 200 with the print job D1_job containing the print data D1_bld already generated at this point in time and the print job D2_job containing the print data D2_bld already generated at this point in time (see the periods 10 and 11 in FIG. 13). After completion of the supply processes to supply the print jobs D1_job and D2_job, the processing sections PS1 to PS4 restart their respective particular processes corresponding to the original image data D3_org (see FIG. 13). After completion of the generation of the print data D3_bld corresponding to the original image data D3_org, the supply section PS5 performs the supply process to supply the printer 200 with the print job D3_job containing the print data D3_bld (see the period 15 in FIG. 13).

Thus, according to the modification shown in FIG. 13, when the print instruction has been obtained before completion of the print data generation process, the print data generation process is interrupted. After the interruption of the print data generation process, one or more pieces of data already generated among all the print data to be supplied are supplied to the printer 200. The print data generation process is restarted after completion of supplying the printer 200 with the one or more pieces of data already generated among all the print data to be supplied. As a result, it is possible to prevent the processing load for generating and supplying the print data from becoming excessively large. Further, it is possible to promptly supply the printer 200 with the print job D1_job containing the print data D1_bld. Accordingly, in substantially the same manner as in the aforementioned modification shown in FIG. 12, the printer 200 is enabled to promptly start printing based on the print job D1_job.

In the printing process of the aforementioned illustrative embodiment, the sequential method and the parallel method are used separately. However, the sequential method may always be employed, or the parallel method may always be employed.

In the printing process of the aforementioned illustrative embodiment, the processing sections PS1 to PS4 configured to perform the print data generation process have been described. However, the configuration of the processing sections PS1 to PS4 to perform the print data generation process is merely an example and may be changed appropriately as needed. For instance, the preview section PS3 and the preview process may be omitted. In this case, for instance, the display of the preview image PI may be omitted. In another instance, the preview image PI may be displayed using the layout image data generated by the layout section PS2.

The rasterization process and the layout process may be performed by a single processing section. A process of generating a print job by adding a print command to print data, included in the supply process by the supply section PS5, may be performed by the build section PS4.

The print data generated by the build section PS4 is image data described in a particular page description language. However, the build section PS4 may generate, as the print data, dot data representing a dot formation state for each pixel and for each color agent (e.g., CMYK ink) used for printing, by performing color conversion and halftone processing for the layout image data. The dot formation state may have, for instance, two states of "no dot" and "with dot," or four states of "no dot," "small," "medium," and "large."

In the aforementioned illustrative embodiment, the target image data includes a plurality of pieces of original image data D1_org, D2_org, and D3_org. Further, the respective particular processes by the processing sections PS1 to PS4 are performed for each of the plurality of pieces of original image data D1_org, D2_org, and D3_org. Instead, for instance, the processing sections PS1 to PS5 may perform their respective particular processes for each partial data contained in a single piece of original image data. For instance, the printer 200 may be an inkjet printer configured to perform printing by repeatedly performing partial printing (also referred to as "pass") a plurality of times to form dots while performing main scanning using a print head. In this configuration, the processing sections PS1 to PS5 may perform their respective particular processes for each partial data for a single pass of partial printing.

In the aforementioned illustrative embodiment, the management section CL determines the upper limit number Nmax of the printing processes executable in parallel, based on the remaining memory capacity Mr (S1 in FIG. 4). Instead of or together with the remaining memory capacity Mr, the upper limit number Nmax may be determined based on other information regarding the resources available for the printing processes. Examples of the information, other than the remaining memory capacity Mr, regarding the resources available for the printing processes may include, but are not limited to, information on a load on the CPU 310, such as the number of applications executed in parallel with the print application PA and a usage rate of the CPU 310. Further, instead of or together with the information regarding the resources available for the printing processes, the upper limit number Nmax may be determined based on information regarding a load due to the printing processes. Examples of the information regarding the load due to the printing processes may include, but are not limited to, information on a maximum size of sheets usable by the printer 200 and information on a maximum print resolution of images printable by the printer 200.

The upper limit number Nmax of the printing processes executable in parallel may always be a same fixed value (e.g., 1, 2, or 3). Further, the upper limit number Nmax of the printing processes executable in parallel may be changed dynamically depending on the usage rate of the CPU 310 or a usage status of the memories used by other applications, even during the execution of the printing processes. For instance, the print application PA may set the upper limit number Nmax to 1 immediately when obtaining, from the OS, a warning that a remaining memory capacity Mr is equal to or less than a reference value.

In each of the aforementioned illustrative embodiment and modifications, the device executing the printing process as illustrated in FIGS. 3 to 7 is the CPU 310 of the terminal device 300. In another instance, the device executing the printing process as illustrated in FIGS. 3 to 7 may be the CPU 210 of the printer 200. In this case, the CPU 210 of the printer 200 causes the print engine 250 to perform printing by supplying a print job to the print engine 250. In yet another instance, the device executing the printing process as illustrated in FIGS. 3 to 7 may be a server configured to obtain image data from the terminal device 300 and generate a print job using the obtained image data. Such a server may include a plurality of computers communicably interconnected via a network. Moreover, the terminal device 300 may cause the server to perform some of the processes as illustrated in FIGS. 3 to 7, for instance, the rasterization process for a particular type of image data.

In each of the aforementioned illustrative embodiment and modifications, a part of the configuration realized by hardware may be achieved by software instead of the hardware. Conversely, at least a part of the configuration realized by software may be achieved by hardware instead of the software. For instance, some of the processes by the processing sections PS1 to PS4 may be achieved by a dedicated hardware circuit (e.g., ASIC) configured to operate according to instructions from the CPU 310.

The following shows examples of associations between elements exemplified in the aforementioned illustrative embodiment and modifications and elements according to aspects of the present disclosure. For instance, the terminal device 300 may be an example of an "image processing device" according to aspects of the present disclosure. The CPU 310 may be an example of a "hardware processor" according to aspects of the present disclosure. The non-volatile storage device 320 storing the application program AP may be an example of a "non-transitory computer-readable medium storing computer-readable instructions" according to aspects of the present disclosure. The CPU 310 and the non-volatile storage device 320 storing the application program AP may be included in a "controller" according to aspects of the present disclosure. The user operable I/F 360 may be an example of a "user interface" according to aspects of the present disclosure. The display 370 may be an example of a "display" according to aspects of the present disclosure. The printer 200 may be an example of a "printing device" according to aspects of the present disclosure. In another instance, the printer 200 may be an example of the "image processing device" according to aspects of the present disclosure. In this case, the CPU 210 may be an example of the "hardware processor" according to aspects of the present disclosure. Further, in this case, the print engine 250 may be an example of the "printing device" according to aspects of the present disclosure.

What is claimed is:

1. A non-transitory computer-readable medium storing computer-readable instructions executable by a hardware processor communicably connected with a printing device and a user interface, the instructions being configured to, when executed by the hardware processor, cause the hardware processor to perform one or more printing processes, each printing process comprising:
   after obtaining a data selection instruction input via the user interface, obtaining a print instruction corresponding to the data selection instruction via the user interface;
   starting generating print data using target image data selected based on the data selection instruction, after obtaining the data selection instruction and before obtaining the print instruction; and
   even after the print data has been generated, not starting providing the print data to the printing device until obtaining the print instruction, but starting providing the print data to the printing device after obtaining the print instruction.

2. The non-transitory computer-readable medium according to claim 1,
   wherein the hardware processor is communicably connected with a display, and
   wherein the instructions are further configured to, when executed by the hardware processor, cause the hardware processor to:
      generate preview image data using the target image data selected based on the data selection instruction, in priority to generating the print data; and
      cause the display to display a preview image using the preview image data, after obtaining the data selection instruction and before obtaining the print instruction.

3. The non-transitory computer-readable medium according to claim 1,
   wherein the data selection instruction contains a first data selection instruction and a second data selection instruction,
   wherein the print instruction contains a first print instruction corresponding to the first data selection instruction, and a second print instruction corresponding to the second data selection instruction,
   wherein the print data contains first print data generated using first target image data selected based on the first data selection instruction, and second print data generated using second target image data selected based on the second data selection instruction, and
   wherein the instructions are further configured to, when executed by the hardware processor, cause the hardware processor to:
      start generating the first print data, after obtaining the first data selection instruction and before obtaining the first print instruction;
      start generating the second print data, after obtaining the second data selection instruction and before obtaining the second print instruction; and
      when the second data selection instruction is obtained before the generation of the first print data is completed, generate the first print data in parallel with generating the second print data.

4. The non-transitory computer-readable medium according to claim 1,
   wherein the instructions are further configured to, when executed by the hardware processor, cause the hardware processor to set an upper limit number of the one or more printing processes executable in parallel, based on at least one selected from information regarding resources available for the one or more printing processes and information regarding a load due to the one or more printing processes.

5. The non-transitory computer-readable medium according to claim 1,
   wherein the print data is generated through a plurality of data generation processes including:
      a first process to generate intermediate image data in a first data format, using the target image data; and
      a second process to generate the print data in a second data format, using the intermediate image data, the second data format being a data format interpretable by the printing device, and
   wherein the instructions are further configured to, when executed by the hardware processor, cause the hardware processor to:
      perform the first process corresponding to first partial data included in the target image data;
      after completion of the first process corresponding to the first partial data, perform, in parallel, the first process corresponding to second partial data included in the target image data and the second process corresponding to the first partial data;
      perform the second process corresponding to the second partial data; and
      when the print instruction is obtained before completion of the second process corresponding to the second partial data, provide the printing device with the print data corresponding to the first partial data, in parallel with performing the second process corresponding to the second partial data.

6. The non-transitory computer-readable medium according to claim 1,
   wherein the print data is generated through a plurality of data generation processes including:
      a first process to generate intermediate image data in a first data format, using the target image data; and
      a second process to generate the print data in a second data format, using the intermediate image data, the second data format being a data format interpretable by the printing device, and
   wherein the instructions are further configured to, when executed by the hardware processor, cause the hardware processor to:
      sequentially perform the plurality of data generation processes that include the first process corresponding to first partial data included in the target image data, the second process corresponding to the first partial data, the first process corresponding to second partial data included in the target image data, and the second process corresponding to the second partial data; and when the print instruction is obtained before completion of the plurality of data generation processes, provide the print data to the printing device after completion of the plurality of data generation processes.

7. The non-transitory computer-readable medium according to claim 1, wherein the print data is generated through a plurality of data generation processes including:
  a first process to generate intermediate image data in a first data format, using the target image data; and
  a second process to generate the print data in a second data format, using the intermediate image data, the second data format being a data format interpretable by the printing device, and wherein the instructions are further configured to, when executed by the hardware processor, cause the hardware processor to:
  sequentially execute the plurality of data generation processes that include the first process corresponding to first partial data included in the target image data, the second process corresponding to the first partial data, the first process corresponding to second partial data included in the target image data, and the second process corresponding to the second partial data;
  when the print instruction is obtained before completion of the plurality of data generation processes, interrupt the sequential execution of the plurality of data generation processes;
  after interrupting the sequential execution of the plurality of data generation processes, provide the printing device with partial print data that has already been generated among all the print data corresponding to the target image data; and
  restart the sequential execution of the plurality of data generation processes after completion of providing the printing device with the partial print data.

8. The non-transitory computer-readable medium according to claim 1, wherein the print data is generated through a plurality of data generation processes including:
  a first process to generate intermediate image data in a first data format, using the target image data; and
  a second process to generate the print data in a second data format, using the intermediate image data, the second data format being a data format interpretable by the printing device, and wherein the instructions are further configured to, when executed by the hardware processor, cause the hardware processor to:
  sequentially execute the plurality of data generation processes that include the first process corresponding to first partial data included in the target image data, the second process corresponding to the first partial data, the first process corresponding to second partial data included in the target image data, and the second process corresponding to the second partial data; and
  when the print instruction is obtained before completion of the plurality of data generation processes, provide the printing device with partial print data that has already been generated among all the print data corresponding to the target image data, in parallel with the sequential execution of the plurality of data generation processes.

9. An image processing device comprising:
a user interface; and
a controller configured to perform one or more printing processes, each printing process comprising:
  after obtaining a data selection instruction input via the user interface, obtaining a print instruction corresponding to the data selection instruction via the user interface;
  starting generating print data using target image data selected based on the data selection instruction, after obtaining the data selection instruction and before obtaining the print instruction; and
  even after the print data has been generated, not starting providing the print data to the printing device until obtaining the print instruction, but starting providing the print data to the printing device after obtaining the print instruction.

10. The image processing device according to claim 9,
wherein the controller comprises:
  a hardware processor; and
  a non-transitory computer-readable medium storing computer-readable instructions configured to, when executed by the hardware processor, cause the hardware processor to perform the one or more printing processes.

11. A method implementable on a hardware processor communicably connected with a printing device and a user interface, the method comprising:
  obtaining a data selection instruction input via the user interface;
  after obtaining the data selection instruction, obtaining a print instruction corresponding to the data selection instruction via the user interface;
  starting generating print data using target image data selected based on the data selection instruction, after obtaining the data selection instruction and before obtaining the print instruction; and
  even after the print data has been generated, not starting providing the print data to the printing device until obtaining the print instruction, but starting providing the print data to the printing device after obtaining the print instruction.

12. The method according to claim 11,
wherein the hardware processor is communicably connected with a display, and
wherein the method further comprises:
  generating preview image data using the target image data selected based on the data selection instruction, in priority to generating the print data; and
  causing the display to display a preview image using the preview image data, after obtaining the data selection instruction and before obtaining the print instruction.

13. The method according to claim 11,
wherein the data selection instruction contains a first data selection instruction and a second data selection instruction,
wherein the print instruction contains a first print instruction corresponding to the first data selection instruction, and a second print instruction corresponding to the second data selection instruction,
wherein the print data contains first print data generated using first target image data selected based on the first data selection instruction, and second print data generated using second target image data selected based on the second data selection instruction, and wherein the method further comprises:
started generating the first print data, after obtaining the first data selection instruction and before obtaining the first print instruction;
starting generating the second print data, after obtaining the second data selection instruction and before obtaining the second print instruction; and
when the second data selection instruction is obtained before the generation of the first print data is completed, generating the first print data in parallel with generating the second print data.

14. The method according to claim 11, further comprising setting an upper limit number of one or more printing processes executable in parallel, based on at least one selected from information regarding resources available for the one or more printing processes and information regarding a load due to the one or more printing processes,
wherein each of the one or more printing processes comprises:
after obtaining the data selection instruction, obtaining the print instruction corresponding to the data selection instruction via the user interface;
starting generating the print data using the target image data selected based on the data selection instruction, after obtaining the data selection instruction and before obtaining the print instruction; and
even after the print data has been generated, not starting providing the print data to the printing device until obtaining the print instruction, but starting providing the print data to the printing device after obtaining the print instruction.

15. The method according to claim 11,
wherein the print data is generated through a plurality of data generation processes including:
a first process to generate intermediate image data in a first data format, using the target image data; and
a second process to generate the print data in a second data format, using the intermediate image data, the second data format being a data format interpretable by the printing device, and
wherein the method further comprises:
performing the first process corresponding to first partial data included in the target image data;
after completion of the first process corresponding to the first partial data, performing, in parallel, the first process corresponding to second partial data included in the target image data and the second process corresponding to the first partial data;
performing the second process corresponding to the second partial data; and
when the print instruction is obtained before completion of the second process corresponding to the second partial data, providing the printing device with the print data corresponding to the first partial data, in parallel with performing the second process corresponding to the second partial data.

16. The method according to claim 11,
wherein the print data is generated through a plurality of data generation processes including:
a first process to generate intermediate image data in a first data format, using the target image data; and
a second process to generate the print data in a second data format, using the intermediate image data, the second data format being a data format interpretable by the printing device, and wherein the method further comprises:
sequentially performing the plurality of data generation processes that include the first process corresponding to first partial data included in the target image data, the second process corresponding to the first partial data, the first process corresponding to second partial data included in the target image data, and the second process corresponding to the second partial data; and
when the print instruction is obtained before completion of the plurality of data generation processes, providing the print data to the printing device after completion of the plurality of data generation processes.

17. The method according to claim 11,
wherein the print data is generated through a plurality of data generation processes including:
a first process to generate intermediate image data in a first data format, using the target image data; and
a second process to generate the print data in a second data format, using the intermediate image data, the second data format being a data format interpretable by the printing device, and
wherein the method further comprises:
sequentially executing the plurality of data generation processes that include the first process corresponding to first partial data included in the target image data, the second process corresponding to the first partial data, the first process corresponding to second partial data included in the target image data, and the second process corresponding to the second partial data;
when the print instruction is obtained before completion of the plurality of data generation processes, interrupting the sequential execution of the plurality of data generation processes;
after interrupting the sequential execution of the plurality of data generation processes, providing the printing device with partial print data that has already been generated among all the print data corresponding to the target image data; and
restarting the sequential execution of the plurality of data generation processes after completion of providing the printing device with the partial print data.

18. The method according to claim 11,
wherein the print data is generated through a plurality of data generation processes including:
a first process to generate intermediate image data in a first data format, using the target image data; and
a second process to generate the print data in a second data format, using the intermediate image data, the second data format being a data format interpretable by the printing device, and
wherein the method further comprises:
sequentially executing the plurality of data generation processes that include the first process corresponding to first partial data included in the target image data, the second process corresponding to the first partial data, the first process corresponding to second partial data included in the target image data, and the second process corresponding to the second partial data; and
when the print instruction is obtained before completion of the plurality of data generation processes, providing the printing device with partial print data that has already been generated among all the print data corresponding to the target image data, in parallel with the sequential execution of the plurality of data generation processes.

* * * * *